(12) United States Patent  
Serebrin

(10) Patent No.: US 8,099,541 B2
(45) Date of Patent: Jan. 17, 2012

(54) MINIVISOR ENTRY POINT IN VIRTUAL MACHINE MONITOR ADDRESS SPACE

(75) Inventor: Benjamin C. Serebrin, Sunnyvale, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 472 days.

(21) Appl. No.: 12/272,955

(22) Filed: Nov. 18, 2008

(65) Prior Publication Data

US 2009/0187698 A1 Jul. 23, 2009

Related U.S. Application Data

(60) Provisional application No. 61/022,700, filed on Jan. 22, 2008.

(51) Int. Cl.
*G06F 12/00* (2006.01)
(52) U.S. Cl. ............................................. 711/6; 711/203
(58) Field of Classification Search ................ 711/6, 203
See application file for complete search history.

(56) References Cited

U.S. PATENT DOCUMENTS

| | | | |
|---|---|---|---|
| 5,522,075 A | 5/1996 | Robinson et al. | |
| 5,822,778 A | 10/1998 | Dutton et al. | |
| 5,826,084 A | 10/1998 | Brooks et al. | |
| 6,061,711 A | 5/2000 | Song et al. | |
| 7,418,584 B1* | 8/2008 | Klaiber et al. | 712/229 |
| 2003/0217250 A1 | 11/2003 | Bennett | |
| 2004/0117532 A1 | 6/2004 | Bennett | |
| 2005/0091652 A1 | 4/2005 | Ross et al. | |
| 2006/0206892 A1 | 9/2006 | Vega et al. | |
| 2007/0106986 A1* | 5/2007 | Worley, Jr. | 718/1 |
| 2009/0113111 A1* | 4/2009 | Chen et al. | 711/6 |

OTHER PUBLICATIONS

Keith Adams, et al., "A Comparison of Software and Hardware Techniques for x86 Virtualization," ASPLOS'06, Oct. 21-25, 2006, ACM, 12 pages.
AMD, "AMD64 Technology; AMD64 Architecture Programmer's Manual vol. 2: System Programming," Publication 24593, Revision 3.12, Sep. 2006, pp. 355-411.
P.H. Gum, "System/370 Extended Architecture: Facilities for Virtual Machines," IBM J. Res Develop., vol. 27, No. 6, Nov. 1983, pp. 530-544.
James L. Turley, "Advanced 80386 Programming Techniques," ISBN 0-07-881342-5, 35 pages 1988.
U.S. Appl. No. 11/740,463, filed Apr. 26, 2007.
U.S. Appl. No. 12/272,946, filed Nov. 18, 2008.
U.S. Appl. No. 12/272,956, filed Nov. 18, 2008.
Office Action from U.S. Appl. No. 11/740,463, mailed Apr. 28, 2011, Benjamin C. Serebrin, 16 pages.
Office Action from U.S. Appl. No. 12/272,956, mailed Mar. 18, 2011, Benjamin C. Serebrin, 6 pages.

* cited by examiner

*Primary Examiner* — Reba I. Elmore
(74) *Attorney, Agent, or Firm* — Lawrence J. Merkel; Meyertons, Hood, Kivlin, Kowert & Goetzel, P.C.

(57) ABSTRACT

In one embodiment, a processor supports an alternate address space during execution of non-guest code (such as a minivisor or a virtual machine monitor (VMM)). The alternate address space may be the guest address space. An instruction in the minivisor/VMM may specify the alternate address space for a data access, permitting the minivisor/VMM to read guest memory state via the alternate address space. In another embodiment, a processor may implement a page table base address register dedicated for the minivisor's use. In still another embodiment, the minivisor may be implemented as a specified entry point in the VMM address space.

18 Claims, 15 Drawing Sheets

Partial Host State Saved by VMRUN Instruction/Loaded at Guest Exit

CS.Selector
    next_RIP
    RFLAGS
    RAX
    SS.Selector
    RSP
    CR0
    CR3
    CR4
    EFER
    IDTR
    GDTR
    DS.Selector
    ES.Selector Partial Guest State Loaded by VMRUN Instruction/Saved at Guest Exit CS.Selector and CS.Hidden
    RIP
    RFLAGS
    RAX
    SS.Selector and SS.Hidden
    RSP
    CR0
    CR2
    CR3
    CR4
    EFER
    IDTR
    GDTR
    DS.Selector and DS.Hidden
    ES.Selector and ES.Hidden
    DR6 and DR7
    VM Regs

Fig. 7

| Guest Mode | Access | Select AS |
|---|---|---|
| Guest | Any | Guest (Current) |
| Non-Guest | Code | Host (Current) |
| Non-Guest | Data, no CS override | Guest (Alternate) |
| Non-Guest | Data, CS override | Host (Current) |

Fig. 14

| Guest Mode | Access | Select AS |
|---|---|---|
| Guest | Any | Guest (Current) |
| Non-Guest | Code | Host (Current) |
| Non-Guest | Data, Seg = Alternate | Guest (Alternate) |
| Non-Guest | Data, Seg = Not Alternate | Host (Current) |

Fig. 15

| Guest Mode | Access | Select AS |
|---|---|---|
| Guest | Any | Guest (Current) |
| Not Guest | Code | Host (Current) |
| Not Guest | Data | Host (Current) |
| Not Guest | Accessor Instruction | Guest (Alternate) |

Fig. 16

State Saved by VMSAVE Instruction/Loaded by VMLOAD Instruction

FS.Selector and FS.Hidden
GS.Selector and GS.Hidden
LDTR (including hidden state)
TR (including hidden state)
KernelGSBase
STAR, LSTAR, CSTAR, SFMASK
SYSENTER CS, ESP, EIP

Computer Accessible Storage Medium 200

| VMM 18 | VMCBs 22 | Host Save Area 50 |

| Guests 10A-10N | Minivisor 172 |

Fig. 24

MINIVISOR ENTRY POINT IN VIRTUAL MACHINE MONITOR ADDRESS SPACE

This application claims benefit of priority to U.S. Provisional Patent Application Ser. No. 61/022,700, filed Jan. 22, 2008. The Provisional Patent Application is incorporated herein by reference. To the extent that anything in the Provisional Patent Application contradicts material expressly included herein, the material herein controls.

BACKGROUND

1. Field of the Invention

This invention relates to virtual machines in computer systems and, more particularly, to switching between virtual machines and the virtual machine manager.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Generally, the world switch involves saving processor state for the guest/VMM being switched away from, and restoring processor state for the guest/VMM being switched to. In some cases, saving/restoring all of the state is necessary. For example, when a guest is being started for the first time, none of the corresponding processor state has been loaded and thus all of the processor state may be saved/loaded. However, in other cases, some of the processor state may not change from guest context to VMM context and vice-versa. In still other cases, a world switch may be brief (e.g. the VMM may execute briefly to service a simple guest exit for an intercepted event), and only a small amount of processor state for the VMM may be needed.

SUMMARY

In one embodiment, a method comprises detecting a guest exit during execution of a guest; determining that the guest exit is to a minivisor, wherein a first amount of guest state saved in the guest exit to the minivisor is less than a second amount of guest state saved in a guest exit to a virtual machine monitor (VMM); and responsive to determining that the guest exit is to the minivisor, exiting to a defined entry point in a VMM address space, the defined entry point associated with the minivisor.

In an embodiment, a computer accessible storage medium stores a plurality of instructions which, when executed in response to a guest exit from a guest to a defined entry point associated with a minivisor: determine that a call to a virtual machine monitor (VMM) is to be performed, wherein a first amount of guest state saved in the guest exit to the minivisor is less than a second amount of guest state saved in a guest exit to a virtual machine monitor (VMM); and save additional guest state prior to calling the VMM, wherein the additional guest state comprises state that is included in the second amount of guest state and not in the first amount of guest state.

In one embodiment, a processor comprises an execution core configured to execute a guest, wherein the execution core is configured to detect a guest exit during execution of the guest, and wherein the execution core is configured to determine that the guest exit is to a minivisor, wherein a first amount of guest state saved in the guest exit to the minivisor is less than a second amount of guest state saved in a guest exit to a virtual machine monitor (VMM), and wherein, responsive to determining that the guest exit is to the minivisor, the processor core is configured to exit to a defined entry point in a VMM address space, the defined entry point associated with the minivisor.

BRIEF DESCRIPTION OF THE DRAWINGS

The following detailed description makes reference to the accompanying drawings, which are now briefly described.

FIG. 7 is a pair of tables illustrating one embodiment of processor state saved and loaded during switches between host and guest execution.

FIG. 14 is a block diagram of a first embodiment of a truth table for selecting an address space to access for an operation.

FIG. 15 is a block diagram of a second embodiment of a truth table for selecting an address space to access for an operation.

FIG. 16 is a block diagram of a third embodiment of a truth table for selecting an address space to access for an operation.

FIG. 23 is a table illustrating one embodiment of processor state saved and loaded in response to VMSAVE and VMLOAD instructions.

FIG. 24 is a block diagram of one embodiment of a computer accessible medium.

Figure 1:
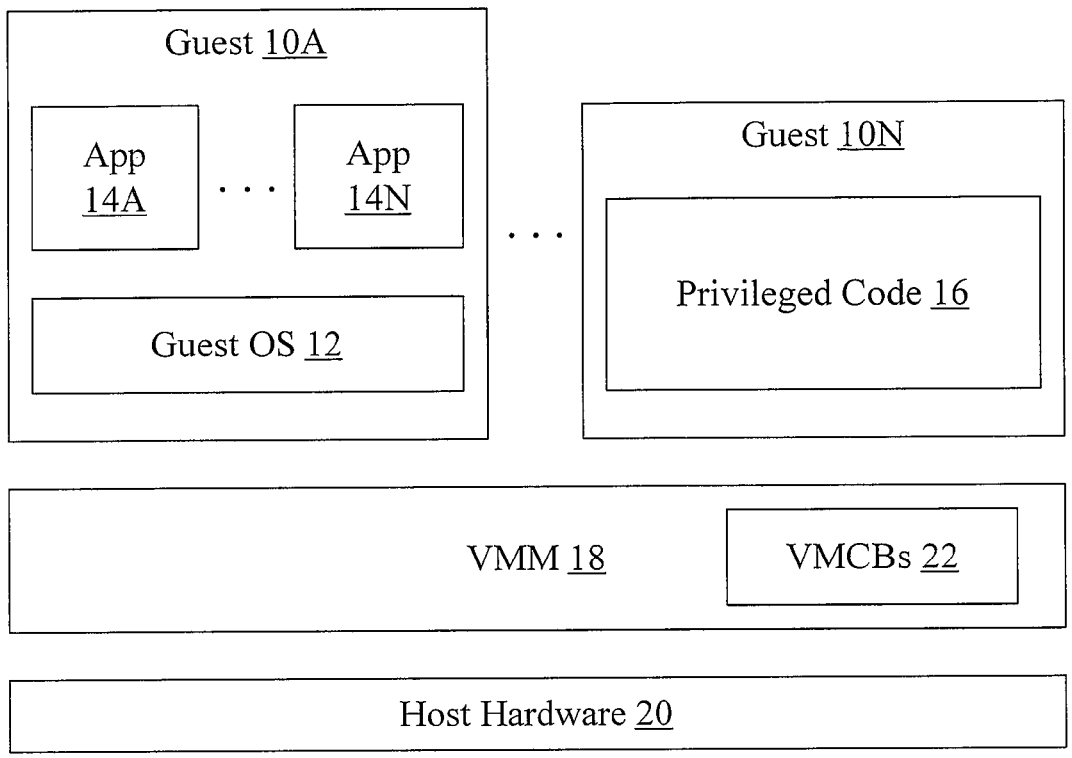
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a minivisor. The minivisor may execute "near" the guest, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

In one embodiment, the processor(s) in the host hardware 20 may support an alternate address space when the VMM code (e.g. the VMM 18 and/or the minivisor, in embodiments that implement the minivisor) is being executed. The alternate address space may be the virtual address space of the guest which has most recently exited. Accordingly, if the VMM code needs to access memory that is accessed by the guest, the VMM code need not include instructions to locate the guest's page tables, process the page tables ("walk" the page tables) to identify the translation, walk the nested page tables (where implemented) and read the resulting physical address in memory. Instead, the VMM code may include an instruction that specifies the alternate address space for the access and the translation hardware may automatically translate the address through the page tables indicated by the alternate address space (e.g. the guest's page tables). Performance of the VMM code may be improved.

Various embodiments of the alternate address space are described in more detail below. Some embodiments may include the minivisor, but it is noted that the minivisor is not required for the alternate address space. The VMM 18 may use the alternate address space for rapid, simple access to the guest's memory even if the minivisor is not employed.

Some embodiments of the processor(s) in the host hardware 20 may also support a separate page table base address register for the minivisor (e.g. separate from the guest page table base address register and the nested page table base address register). The minivisor page table base address register may be dedicated to the minivisor. That is, the minivisor page table base address register may only be used for translation when the minivisor is executing. The minivisor page table base address register may not be used for translation of guest or VMM 18 addresses. Providing a separate minivisor page table base address register may permit flexibility in paging for the minivisor. For example, having the separate minivisor page table base address register may permit a different page table than the nested page table managed by the VMM 18 to be used for the minivisor. If the nested page table is desired as the minivisor's page table, the minivisor page table base address register may be programmed the same as the nested page table base address register. Additionally, having the separate minivisor page table base address register may permit the VMM 18 to interact with the minivisor even if the minivisor is "distrusted" from a security point of view. The minivisor may be allocated its own page tables, separate from the nested page tables, and the VMM 18 may control the minivisor's access to each page directly via the minivisor page tables. Each page table base address may locate a corresponding page table or page tables in memory. Various embodiments are described in further detail below. In other embodiments, the nested page tables may be used for minivisor translations (e.g. the nested page tables may be a single walked page table for the minivisor translations).

In another embodiment, the minivisor may be implemented as a specific entry point in the VMM 18's address space. The heavier-weight exit mechanism may be used for non-minivisor exits, and the entry point to the VMM 18 may be the instruction subsequent to the most recent VMRUN instruction. Thus, the non-minivisor exits may begin execution at various points within the VMM 18. Such code may expect (i.e. may be coded with the assumption that) the heavier-weight exit mechanism has occurred. Thus, such code may update state that has not been saved, thereby destroying guest state. By restricting the minivisor exits to a specific entry point, the code that executes when a minivisor exit occurs expects only a minivisor-type world switch and may save additional state before initiating execution of code that expects the heavier-weight world switch. Further details of various embodiments are provided below.

An overview of some embodiments of the minivisor is next provided, to provide context for embodiments that implement the minivisor. Subsequently, the alternate address space, the separate minivisor page table base register, and the minivisor entry point will be described in greater detail.

Minivisor Overview

The processor(s) in the host hardware 20 may support a world switch using at least two exit mechanisms from the guest, as mentioned above. Specifically, in one embodiment, each exit mechanism may include storing only a certain amount of the guest's processor state (and loading at least some corresponding state for the code to be executed after exit and/or setting state to predetermined values). That is, the amount saved/loaded by the processor may exclude at least some of the processor state. The amount stored in each mechanism may differ, and the amount stored in one mechanism may be greater than the amount stored in another mechanism. The amount of state stored and loaded automatically is generally correlated to the amount of time needed to perform the world switch, and thus is correlated to the performance of the computer system when executing virtual machines. The exit mechanism that stores a lesser amount of state may also be more limited in the processing that it can accomplish (at least without storing additional state) but may be used to perform certain processing that does not require as much state save.

Figure 2:
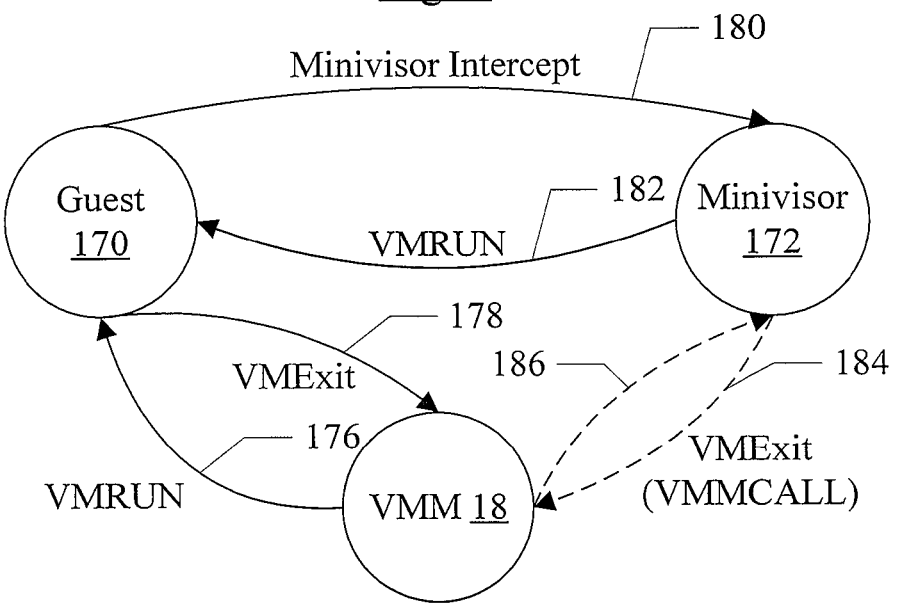
FIG. 2 is a block diagram of one embodiment of various modes that may be supported in the virtualization.

In one embodiment, the exit mechanism that stores less processor state may exit to a "minivisor". The exit mechanism that stores more processor state may be an exit to the VMM 18. FIG. 2 is a block diagram illustrating various transitions, for one embodiment. A guest 170 is shown, along with a minivisor 172 and the VMM 18. The guest 170 may be, e.g., one of the guests 10A-10N. Generally, a guest may be initiated by the VMM 18 using the VMRUN instruction (arrow 176). Execution of the VMRUN instruction may enable various intercept events, and may identify the exit for the enabled intercept events to either the minivisor 172 or the VMM 18. An exit to the VMM 18 (VMExit, arrow 178) may involve storing a relatively large amount of state. The VMM 18 may process the intercept and return to the guest 170 using the VMRUN instruction, similar to initiating the guest 170 (arrow 176). A minivisor intercept (arrow 180) may involve storing a relatively small amount of state and may invoke the minivisor 172. The minivisor 172 may process the intercept event and return to the guest 170 (e.g. using the VMRUN instruction, arrow 182). If the VMRUN instruction is used to return from the minivisor 172 to the guest 170, there may be an operand or other encoding that informs the processor that the VMRUN is executed in the minivisor 172, so that the proper processor state may be restored. In other embodiments, a different instruction may be used to return to the guest 170, or the VMRUN instruction may be used and a mode in the processor may indicate that the minivisor 172 is executing the VMRUN instruction.

In some embodiments, the minivisor 172 may detect that it is unable to process the intercept event. For example, the minivisor 172 may generally be capable of processing the event, but certain unlikely or infrequent event scenarios may require processing by the VMM 18. Or, the minivisor 172 may be incapable of processing the event but the intercept configuration may be erroneously programmed to exit to the minivisor 172. In such cases, the minivisor 172 may return to the guest 170, but may signal an intercept event that causes an exit to the VMM 18. Thus, the guest 170 may exit again, this time to the VMM 18. Alternatively, the minivisor 172 may have a mechanism for exiting to the VMM 18 (arrow 184). For example, in one embodiment, a VMMCALL instruction may be supported for guests to signal an exit to the VMM 18 (e.g. for paravirtualization). The minivisor 172 may use such an instruction to exit to the VMM 18. The same VMExit mechanism used to exit from the guest 170 to the VMM 18 may be used to exit from the minivisor 172 to the VMM 18, or a different mechanism may be used. In some embodiments, the minivisor may execute a modified form of a VMSAVE instruction (described below) to save remaining state that was not saved on the minivisor intercept, and may execute the VMMCALL or another instruction to transfer control to the VMM 18. The VMSAVE instruction may be defined to store additional processor state that is not easily accessible to software but which may not always need to be saved on a VMExit. The modified form of the VMSAVE instruction may save the processor state that is not stored on a minivisor intercept but is stored on the VMExit. The modified form may or may not also store the additional processor state that the unmodified form of the VMSAVE would store, in various embodiments.

The VMM 18 may process the intercept event, and may return to the guest 170 using the VMRUN instruction. Alternatively, the VMM 18 may be configured to return to the minivisor 172 (arrow 186), using the VMRUN instruction or a different instruction.

In some embodiments, the amount of state stored on VMExit may be less than the total processor state. Thus, the VMExit amount of state may be an intermediate amount that may be sufficient for some types of processing. In other cases, the VMM 18 may save/load additional processor state as needed. However, since only a portion of the state is automatically saved/loaded, the VMM 18 may have flexibility in how much additional state is saved/loaded and thus how much additional processing time is expended in the additional state save/load.

In some embodiments, the processor(s) may support additional instructions defined to save/load additional state to/from the VMCBs 22. These instructions will be referred to herein as the VMLOAD and VMSAVE instructions. The VMLOAD instruction is defined to load additional state from a VMCB 22 to the processor, and the VMSAVE instruction is defined to save additional state to the VMCB 22. For example, in some embodiments, the processor state may include "hidden state" in some registers. As used herein, hidden state is state saved in a processor register that is not directly readable via instruction execution. For example, in the x86 instruction set architecture, the segment registers have a non-hidden portion into which a segment selector identifying a segment descriptor in a segment descriptor table is loaded. Additionally, information from the segment descriptor (or derived from the segment descriptor) is loaded into a hidden portion of the segment register when a segment selector is loaded. The non-hidden portion may also be read from the register via instruction execution (e.g. to be stored to memory), but the hidden portion storing the segment descriptor information cannot be directly read via instruction execution according to the x86 instruction set architecture. In some embodiments, the VMLOAD/VMSAVE instructions may be defined to load/save the hidden state from/to the VMCB 22.

In other embodiments, the VMLOAD/VMSAVE instructions may be defined to load/save the state of two or more control registers that involve serialization in the processor when changed (e.g. paging control registers, mode control registers, etc.). That is, the processor may permit the pipeline to drain of any other instructions, wait for speculative execution of operations to complete, etc. before changing the control registers. While each control register is typically readable/writable using an individual instruction, repeatedly serializing for such individual read/write operations may be slower than having a single instruction that reads/writes multiple control registers. In other embodiments, the VMLOAD/VMSAVE instructions may load/save hidden state and state corresponding to two or more control registers. In still other embodiments, the VMLOAD/VMSAVE instructions may load/save all processor state not loaded/saved by the processor hardware during the switch, or may load/save any subset of the processor state.

As used herein, saving processor state may refer to transferring the processor state from the processor to a storage location (e.g. in memory). The processor state in the processor may not be changed due to the saving. Additionally, restoring processor state may refer to transferring the state from the storage location to the processor. The processor state in the storage location may not be changed due to the restoring.

For convenience and brevity in the remainder of this description, the portion of the processor state that is saved/loaded during a world switch to/from the VMM 18 may be referred to as the VMExit partial state. The portion of the processor state that is saved/loaded during a world switch from the guest 10A-10N to the minivisor 172 may be referred to as the minivisor partial state.

Figure 3:
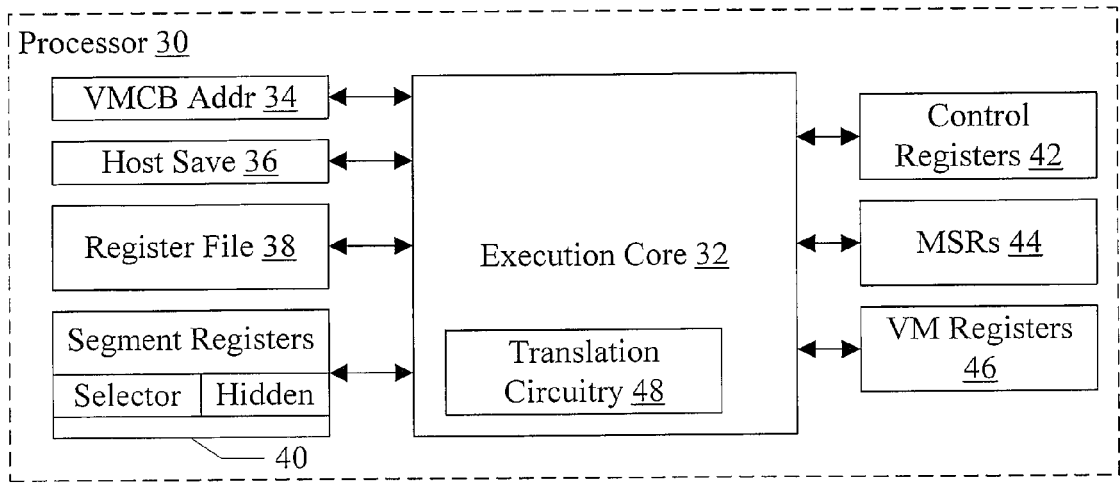
FIG. 3 is a block diagram of a portion of one embodiment of a processor.

FIG. 3 is a block diagram illustrating one embodiment of a processor 30 that may be included in the host hardware 20 and may provide support for world switch using multiple exit mechanisms as mentioned above. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a superpipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include translation circuitry 48 that performs address translation according to an address translation mechanism defined for the processor 30. In one embodiment, the address translation mechanism may include nested paging to support guests. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used.

In one embodiment, the translation circuitry 48 may include a translation lookaside buffer (TLB) configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size.

When executing a VMRUN instruction (described above and in more detail below), the execution core 32 may save the address of the VMCB identified by the VMRUN instruction in the VMCB address register 34. Subsequently, during a guest exit, the execution core 32 may save the partial processor state to the VMCB indicated by the VMCB address register 34. The amount of processor state saved depends on the exit mechanism being used for the detected intercept event. The host save register 36 may store an address of a host save area in which host processor state (e.g. corresponding to the VMM 18) may be saved. The execution core 32 may save VMExit partial processor state in the host save area during execution of the VMRUN instruction, and may load VMExit partial processor state from the host save area during a guest exit to the VMM 18.

In one embodiment, the minivisor partial processor state may be stored in the VMCB 22 of a given guest, in addition to the partial processor state corresponding to the guest itself. Accordingly, guest exit to the minivisor 172 may include storing the minivisor partial processor state to the VMCB 22 and loading the minivisor state from the VMCB 22.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc. In embodiments implementing the alternate address space using control registers, the control registers 42 may include the alternate address space registers (e.g. CR9 to CR11, in one embodiment). Additionally, in embodiments implementing the separate minivisor page table base register as a control register, the control registers 42 may include the minivisor page table base address register (e.g. mCR3). Similarly, in embodiments that implement the minivisor entry point as a control register, the control registers 42 may include the minivisor entry point register.

The MSRs 44 may comprise one or more registers that are implementation dependent. That is, the instruction set architecture may permit a given implementation to define any set of MSRs 44 that may be desirable for that implementation. In embodiments implementing the alternate address space using MSRs, the MSRs 44 may include the alternate address space registers. Additionally, in embodiments implementing the separate minivisor page table base register as an MSR, the MSRs 44 may include the minivisor page table base address register. Similarly, in embodiments that implement the minivisor entry point in an MSR, the MSRs 44 may include the minivisor entry point register.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 3 to illustrate the world switch functionality of the processor 30 (in conjunction with the flowchart discussed below). For example, the VM registers 46 may include registers that may be loaded with virtual interrupt state to permit an interrupt to be injected into a guest. The VM registers 46 may also include an intercepts register or registers. The intercept register or registers may store the intercept configuration. The execution core 32 may be configured to monitor for various intercepts indicated in the intercepts register, and to exit using the exit mechanism as indicated in the intercepts register. The intercepts register may be loaded from the VMCB 22 of a guest 10A-10N when execution of that guest 10A-10N is initiated (e.g. using the VMRUN instruction described above). Other VM registers 46 may be included to virtualize various other processor state, system resources, etc. In some embodiments, some or all of the VM registers 46 may be defined as MSRs. Additionally, one or more of the alternate address space registers, the minivisor page table base register, and the minivisor entry point register may be implemented as the VM registers 46.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 4:
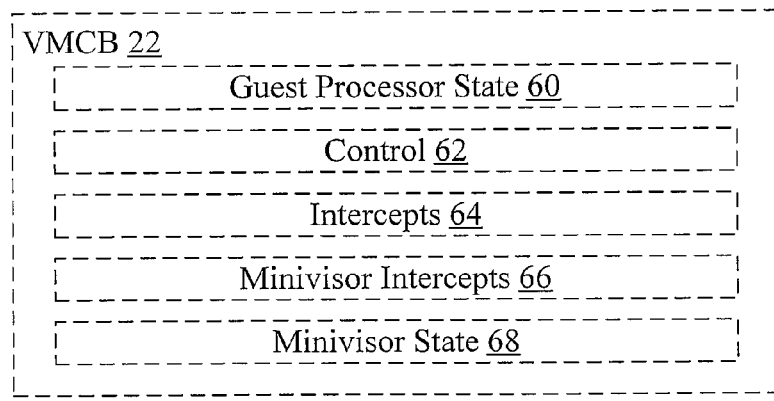
FIG. 4 is a block diagram of one embodiment of a virtual machine control block.

FIG. 4 is a block diagram of one embodiment of a VMCB 22. In the embodiment of FIG. 4, the VMCB 22 may include a guest processor state 60, control data 62, intercepts 64, minivisor intercepts 66, and minivisor state 68. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the VMRUN instruction. The processor 30 may save processor state from the processor 30 to the guest processor state 60 during the guest exit. The guest processor state 60 may be defined to store all the processor state, even though the processor 30 only saves/loads partial state as described above. Other state may be saved/loaded by the VMM 18 and/or the minivisor 172 as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. The intercepts 64 may specify which events are enabled for intercept (causing an exit from the guest). The intercepts 64 may define exits to the VMM 18, using the VMExit mechanism. Similarly, the minivisor intercepts 66 may specify which events are enabled for intercept, causing a guest exit to the minivisor 172. In other embodiments, the intercepts 64 may specify which intercept events are enabled for intercept, and the intercepts 66 may indicate which exit mechanism to use (VMExit or minivisor exit). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. There may be one intercept indication in the intercepts 64 and one intercept indication in the intercepts 66 for each intercept event. Thus, the intercepts 64 and 66 may comprise one embodiment of an intercept configuration.

The minivisor state 68 may comprise the processor state corresponding to the minivisor 172. The minivisor state 68 may be smaller than the guest processor state 60, in general. A more specific example of the minivisor state 68 is discussed below. In other embodiments, the minivisor state 68 may be stored in a separate data structure than the VMCB 22. In embodiments implementing the minivisor page table base address register, the minivisor page table base address register may be considered part of the minivisor state 68.

Figure 5:
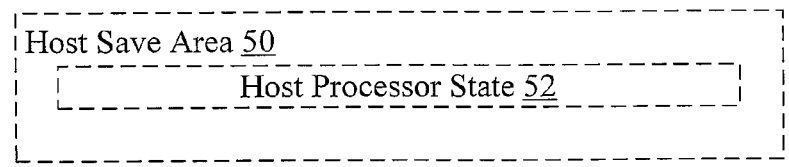
FIG. 5 is a block diagram of one embodiment of a host save area.

FIG. 5 is a block diagram of one embodiment of a host save area 50 that may be used to store host processor state 52. The host processor state 52, similar to the guest processor state 60, may be defined to store all the processor state that is considered part of the context. However, the host processor state 52 may correspond to the VMM 18 (and other host code, such as a host O/S, in some embodiments). In other embodiments, the host processor state 52 may not be defined to store all the processor state. The host processor state 52 may be defined the same as the guest processor state 60 in some embodiments. The processor 30 may save processor state from the processor 30 to the host processor state 52 during execution of the VMRUN instruction, and may load processor state to the processor 30 from the host processor state 52 during a guest exit to the VMM 18. The host save register 36 may store an address that locates the host save area 50.

Alternate Address Space

While some of the discussion below is still part of the minivisor overview, additional details of one embodiment of the alternate address space are mentioned beginning with FIG. 6.

Figure 6:
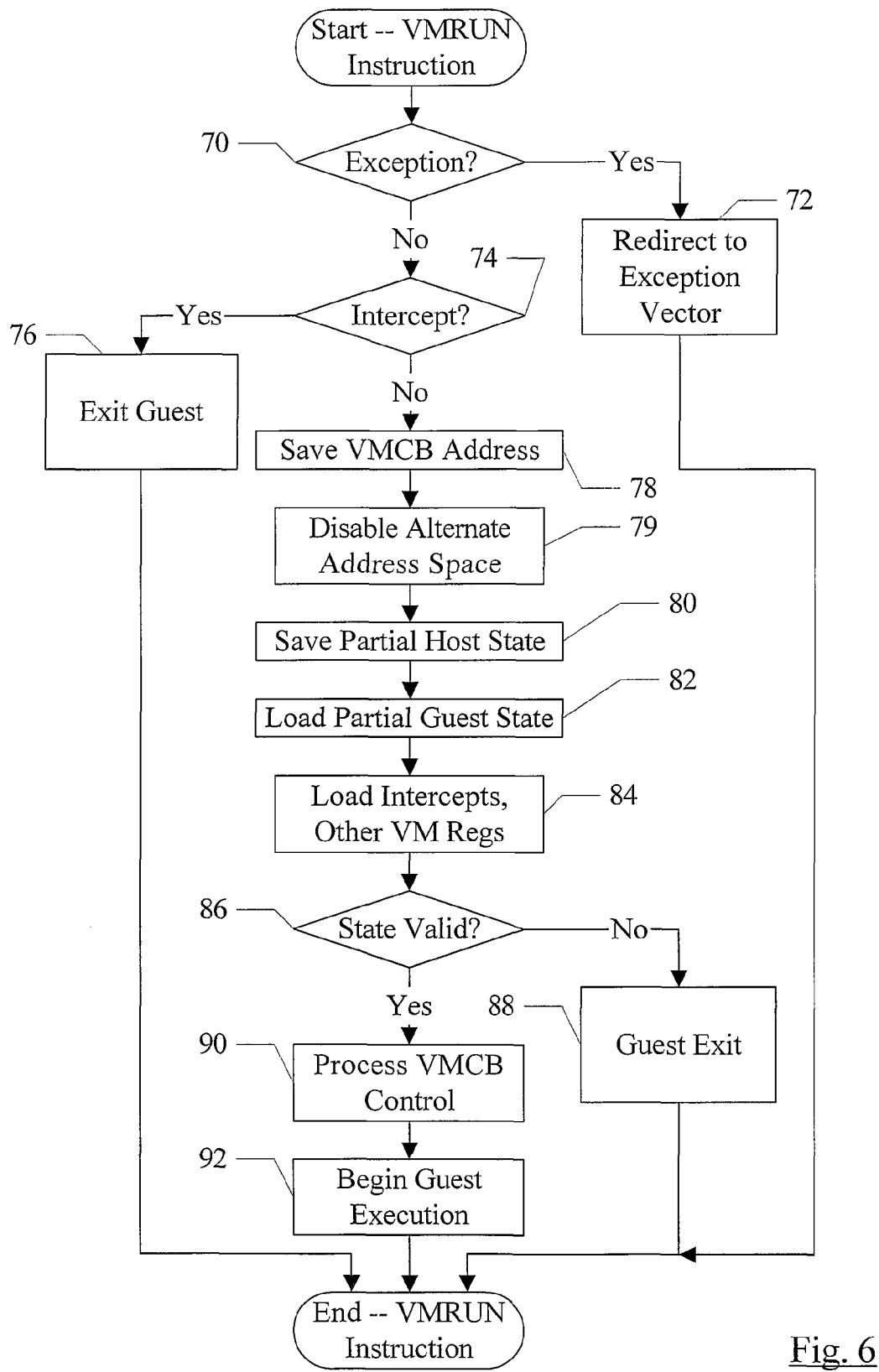
FIG. 6 is a flowchart illustrating operation of one embodiment of a processor in response to a virtual machine run (VMRUN) instruction.

Turning next to FIG. 6, a flowchart is shown illustrating operation of one embodiment of the processor 30 (and more particularly the execution core 32, in the embodiment of FIG. 3) to execute a VMRUN instruction. The processor 30/execution core 32 may comprise circuitry, microcode, or any combination thereof that implements the operation shown in FIG. 6. The execution may be pipelined over multiple clock cycles, if desired.

The execution core 32 may determine if the VMRUN instruction causes an exception (decision block 70). If the VMRUN instruction causes an exception (decision block 70, "yes" leg), the execution core 32 may redirect execution to the exception vector that corresponds to the exception, as defined in the instruction set architecture implemented by the processor 30 (block 72). Various exception conditions occur in various embodiments. For example, in one embodiment, the VMRUN instruction may be enabled via a bit in one of the VM registers 46. If the VMRUN instruction is not enabled, an exception may be signalled. Also, the VMRUN instruction may be a privileged instruction in one embodiment, and thus if the processor 30 is not in a privileged mode (e.g. the privileged mode is a current privilege level of zero in the x86 instruction set architecture), an exception may be signalled. In one embodiment, the VMRUN instruction may only be executed if paging is enabled and in protected mode and thus an exception may be signalled if the proper mode is not set in the control registers 42. In one embodiment, the VMCB 22 may be required to be aligned to a page boundary and the VMRUN instruction may cause an exception if the VMCB 22 is not so aligned. In one embodiment, the VMRUN instruction may not be executed in virtual 8086 mode, and an exception may be signalled if the processor 30 is in virtual 8086 mode.

In one embodiment, execution of the VMRUN instruction is one of the events that may be intercepted. If the execution is intercepted (decision block 74, "yes" leg), the execution core 32 may exit the guest instead of executing the VMRUN instruction (block 76). The exit may be to the minivisor, or to the VMM 18, depending on the corresponding intercept indications.

If there is no exception or intercept (decision block 70, "no" leg and decision block 74, "no" leg), the execution core 32 may save the VMCB address in the VMCB address register 34 (block 78). The VMCB address may be specified by one or more operands of the VMRUN instruction. For example, in one embodiment, the VMCB address may be specified in the RAX register (the 64 bit version of the EAX register defined in the AMD64™ extension to the x86 instruction set architecture). In embodiments that implement that alternate address space, the alternate address space may be disabled (i.e. the guest does not have access to an alternate address space) (block 79). Additionally, execution core 32 may save the VMExit partial host state to the host save area 50 indicated by the host save register 36 (block 80). The execution core 32 may load the VMExit partial guest state from the guest processor state 60 of the VMCB 22 (block 82). Additionally, the execution core 32 may load the intercepts from the intercepts 64 of the VMCB 22 and any other VM registers 46 as specified in the VMCB 22 (block 84).

The execution core 32 may check the processor state as loaded from the VMCB 22 to ensure that a valid state has been loaded (decision block 86). If an invalid state has been loaded (decision block 86, "no" leg), the execution core 32 may exit the guest to the VMM (block 88). In other embodiments, the execution core 32 may cause an exception, if the processor 30 may function in the invalid state, or a processor shutdown (e.g. similar to entering a low power state). In still other embodiments, the execution core 32 may check the state in the VMCB 22 and the processor 30 (for state not loaded during execution of the VMRUN instruction) prior to loading the state to ensure that the state is valid (e.g. as part of determining whether or not to cause an exception, illustrated at decision block 70).

If the processor state is valid (decision block 86, "yes" leg), the execution core 32 may process any operations specified in the VMCB control 62 (block 90). The execution core 32 may then begin guest execution (block 92). It is noted that, if the VMRUN instruction is also used to return from the minivisor 172 to the guest, similar operation may be performed except that the partial state saved/restored may be the minivisor partial state.

FIG. 7 is a pair of tables 100 and 102 illustrating the VMExit partial processor state saved and loaded according to one embodiment of the processor 30 that implements the x86 instruction set architecture (including the AMD64™ extensions). The register names used in the tables 100 and 102 correspond to the names used in the x86 instruction set architecture with AMD64™ extensions. Other embodiments may save/load any partial processor state, including any subset or superset of the state shown.

Table 100 shows the partial host state that is saved during execution of the VMRUN instruction and loaded during guest exit to the VMM 18 for the present embodiment. In the illustrated embodiment, the partial host state includes: the CS segment selector and the instruction pointer of the next instruction in the host after the VMRUN instruction (next_RIP); the flags (RFLAGS); the RAX register; the SS segment selector; the current stack pointer (RSP); the control registers CR0, CR3, CR4, and EFER; the interrupt descriptor table register (IDTR); the global descriptor table register (GDTR); the ES segment selector; and the DS segment selector.

Table 102 shows the partial guest state that is loaded during execution of the VMRUN instruction and saved during guest exit to the VMM 18 for the present embodiment. In the illustrated embodiment, the same processor state shown in table 100 is saved/loaded. Additionally, the hidden portion of the CS, DS, ES, and SS segment registers is saved/loaded as well as the debug registers DR6 and DR7 and the VM registers 46. Thus, in this embodiment, the partial state saved/loaded for a host and the partial state saved/loaded for a guest during a switch overlap but are not identical. In other embodiments, the same partial state may be saved/loaded for host and guest, or other overlapping subsets of processor state may be saved/loaded.

Figure 8:
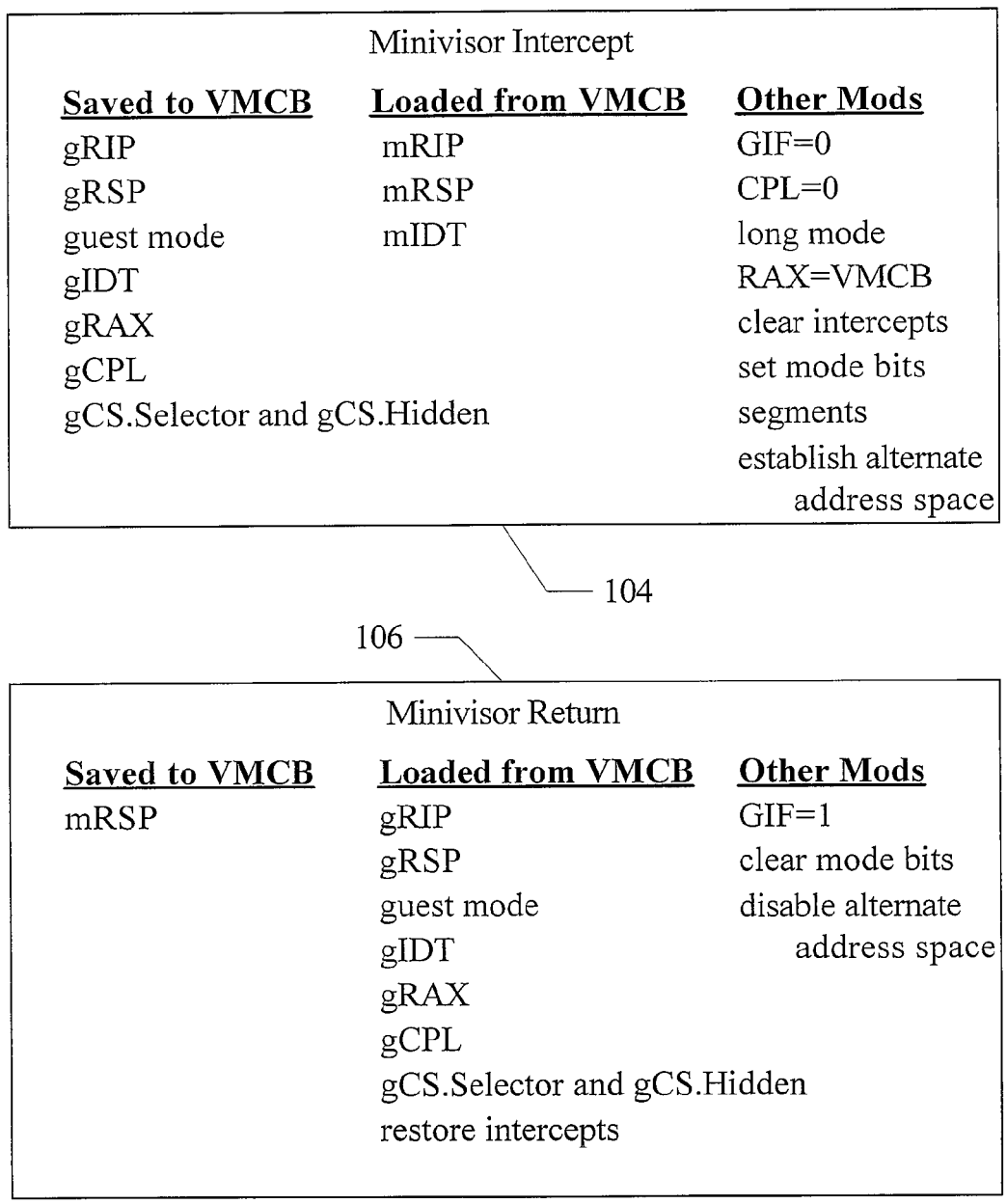
FIG. 8 is a pair of tables illustrating one embodiment of processor state saved and loaded during switches between minivisor and guest execution.

FIG. 8 is a pair of tables 104 and 106 illustrating the minivisor partial processor state saved and loaded for a minivisor intercept and a minivisor return, respectively, according to one embodiment of the processor 30 that implements the x86 instruction set architecture (including the AMD64™ extensions). The register names used in the tables 104 and 106 correspond to the names used in the x86 instruction set architecture with AMD64™ extensions, except that the names are preceded, in some cases, by a lower case "g" or a lower case "m". The lower case "g" refers to guest processor state, and the lower case "m" refers to minivisor processor state. Other embodiments may save/load any partial processor state, including any subset or superset of the state shown.

Table 104 illustrates state changes for a minivisor intercept (arrow 180 in FIG. 2). State saved to the VMCB 22 includes the following guest state: the RIP, the RSP, the guest mode, the IDT configuration, RAX, the current privilege level (CPL), and the CS segment selector and hidden portion. The guest state is stored into the guest processor state 60 of the VMCB 22. State loaded from the VMCB 22 (from the minivisor state 68) includes the RIP (which points to the initial instruction of the minivisor 172, and is the same each time the minivisor 172 is entered), the RSP, and the IDT configuration. Additionally, the processor 30 may force certain state to predefined values. The global interrupt flag (GIF) may be cleared; the CPL may be set to 0 (most privileged), the processor mode may be placed in long mode (the 64 bit extension mode of AMD64); the RAX may be set to the address of the VMCB, from the register 34; the intercept configuration may be cleared (so that no intercepts are enabled); a mode bit or bits indicating minivisor mode may be set (in some embodiments implementing such bits); and the host segment context may be loaded. Additionally, in embodiments implementing the alternate address space, the processor may establish the alternate address space. See the additional description of establishing the alternate address space below. In one embodiment, the alternate address space may be available only in response to an intercept and transition to the minivisor 172 or VMM 18.

Table 106 illustrates state changes for a minivisor return to the guest (arrow 182 in FIG. 2). The RSP of the minivisor 172 may be saved back to the minivisor state 68 of the VMCB 22. The RIP is not stored because the minivisor 172 may be entered at the same point each time (the instruction indicated by the RIP), not from the exit point. The IDT configuration may not be subject to change by the minivisor 172, and thus also need not be saved. The same state that was stored to the VMCB 22 (in the guest processor state 60) is loaded from the VMCB 22. Additionally, the intercept configuration (e.g. intercepts 64 and 66) may be restored from the VMCB. The GIF may be set; and the minivisor mode bits (if implemented) may be cleared. Additionally, in embodiments implementing the alternate address space, the processor may disable the alternate address space. Enabling/disabling the alternate address space may also be performed on VMExit to the VMM 18 and on execution of the VMRUN instruction.

Accordingly, comparing tables 104-106 to tables 100-102, less state is stored and loaded for a minivisor exit mechanism than for a VMExit exit mechanism. Accordingly, the minivisor exit mechanism may be lighter weight, and may be lower latency than the VMExit exit mechanism, in some embodiments.

Figure 9:
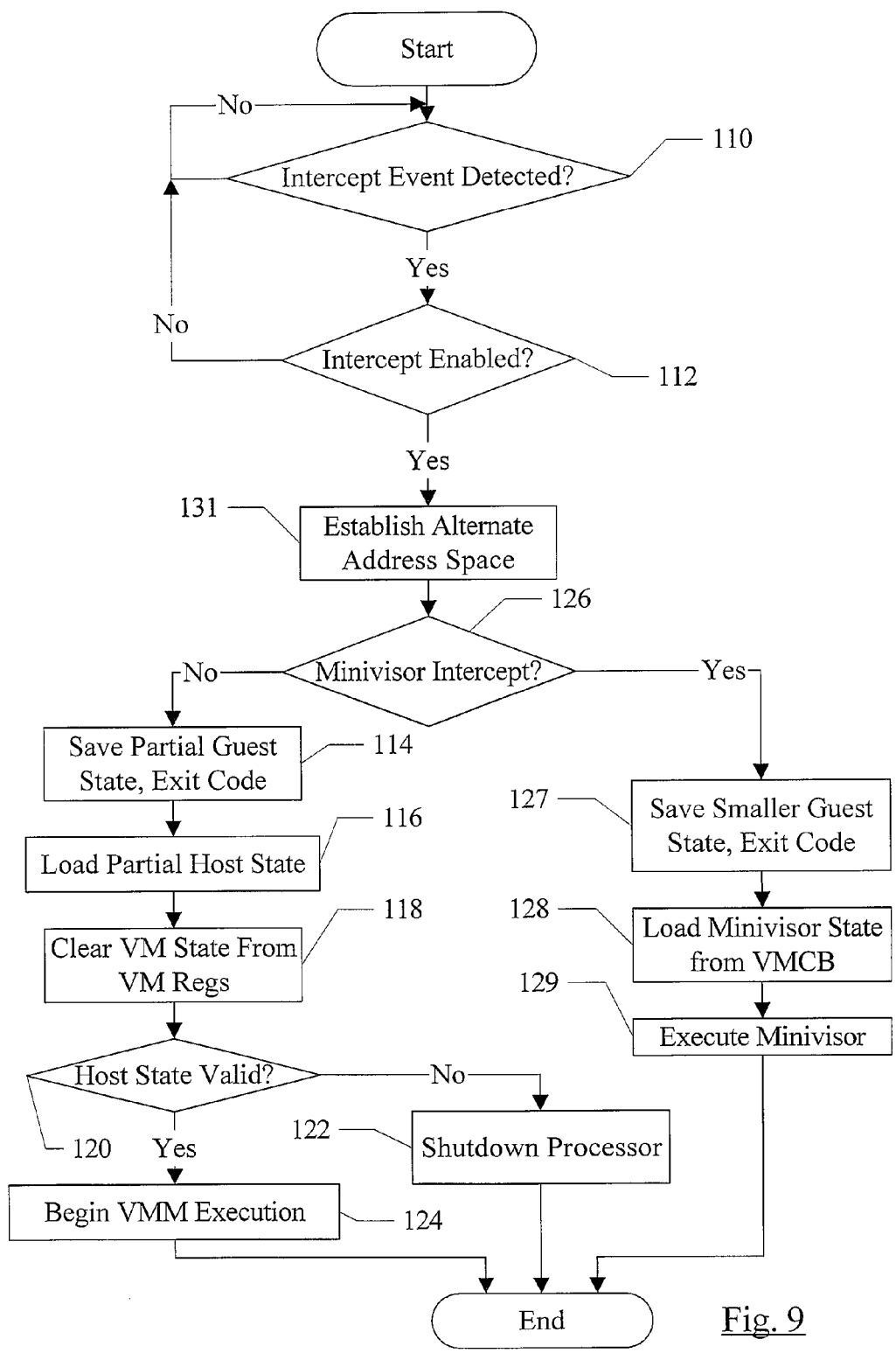
FIG. 9 is a flowchart illustrating one embodiment of intercepting an event in the guest.

Turning next to FIG. 9, a flowchart is shown illustrating operation of one embodiment of the processor 30 (and more particularly the execution core 32) for detecting a guest exit and performing the guest exit. The processor 30/execution core 32 may comprise circuitry, microcode, or any combination thereof that implements the operation shown in FIG. 9. The execution may be pipelined over multiple clock cycles, if desired.

If the execution core 32 detects an intercept event (decision block 110, "yes" leg) and the corresponding intercept is enabled (in the VMCB 22, and loaded into the processor 30 when execution of the guest is started—decision block 112, "yes" leg) the execution core 32 exits the guest. If no intercept event is detected (decision block 110, "no" leg) or the intercept is not enabled (decision block 112, "no" leg), execution continues. The exit mechanism may also be determined from the intercept configuration (decision block 126)

The execution core 32 may establish the alternate address space responsive to determining that an intercept has occurred (block 131). Establishing the alternate address space may be performed in various fashions, in various embodiments. For example, in one embodiment, one or more registers may be defined to store the alternate address space data. The alternate address space data may include a page table base address identifying the page tables, the address space identifier (ASID), and various control bits (e.g. paging mode enable bits, configuration bits defining page size, etc.). Establishing the alternate address space may comprise copying the intercepted guest's data to the alternate address space registers. In other embodiments, the alternate address space registers may be architecturally defined so that they are accessible via instructions, but there may not be actual copying of state. Instead, circuitry may properly select the guest state or the host state as the current address space based on whether the guest is executing or the minivisor/VMM code is executing. Establishing the alternate address space may include determining that the processor is executing VMM code (the minivisor 172 or the VMM 18). An internal to the processor (not software accessible) mode bit may track which code is being executed, for example. Each address space may be mappable to system memory in the computer system (e.g. via page tables).

If the guest is being exited using the VMExit mechanism (decision block 126, "no" leg), the execution core 32 may save the VMExit partial processor state into the guest's VMCB 22 and the exit code indicating the reason for exit (e.g. identifying the intercept event that was detected). As mentioned previously, the guest's VMCB 22 may be located by the address in the VMCB address register 34 (block 114). The execution core 32 may load the VMExit partial host state from the host save area 50, as located by the host save register 36 (block 116). Additionally, the execution core 32 may clear the VM state from the VM registers 46 (block 118). For example, the virtual interrupt request used to inject a virtual interrupt into a guest may be cleared to prevent the virtual interrupt from being taken in the VMM 18.

The execution core 32 may check the processor state as loaded from the host save area 50 to ensure that a valid state has been loaded (decision block 120). If an invalid state has been loaded (decision block 120, "no" leg), the execution core 32 may shutdown the processor 30 (block 122). In other embodiments, the execution core 32 may cause an exception or a guest exit, or may check the state in the host save area 50 and the processor 30 (for state not loaded during the guest exit) prior to loading the state to ensure that the state is valid. If the processor state is valid (decision block 120, "yes" leg), the execution core 32 may begin VMM execution (block 124).

If the exit is a minivisor intercept, using the minivisor exit mechanism (decision block 126, "yes" leg), the processor 30 may save the smaller minivisor partial guest state to the VMCB 22 and may load the minivisor partial state from the VMCB 22 (blocks 127 and 128). The processor 30 may then execute the minivisor 172 (block 129). In the illustrated embodiment, a check for valid minivisor state may be avoided since the state loaded is small. Other embodiments may check for a valid state as well.

Figure 10:
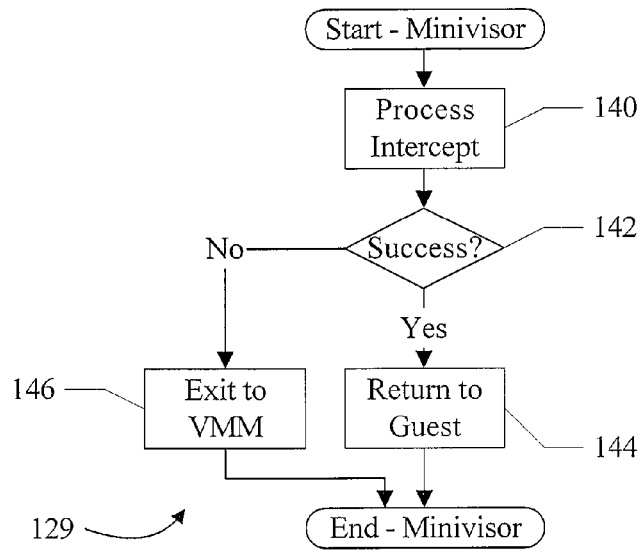
FIG. 10 is a flowchart illustrating operation of one embodiment of a minivisor.

FIG. 10 is a high level flowchart illustrating one embodiment of the execution of the minivisor 172. The details of a given minivisor 172 are implementation-specific. For example, one embodiment may virtualize the time stamp counter (TSC) and the minivisor may emulate accesses to the TSC. Various advanced programmable interrupt controller (APIC) virtualizations may be implemented, and the minivisor 172 may emulate the APIC. Any set of intercept processing may be implemented. The minivisor 172 may comprise instructions which, when executed, implement the operation of FIG. 10.

The minivisor 172 may process the detected intercept event (block 140). Generally, processing an intercept event may comprise taking any actions that are needed to ensure that the guest may continue executing correctly when the minivisor 172 returns. The processing may include emulating the intercepted event. For example, if the intercepted event is an instruction, the minivisor 172 may emulate the instruction (possibly updating processor state, like target registers, with the result or updating memory with a result). If the intercept event is an exception, processing the intercept event may include handling the exception.

If the minivisor 172 successfully processes the intercept event (decision block 142, "yes" leg), the minivisor 172 may return to the guest 170 (block 144). If the minivisor 172 is unsuccessful in processing the intercept event (decision block 142, "no" leg), the minivisor 172 may cause an exit to the VMM 18 (block 146). The exit may occur in various fashions. The minivisor 172 may be configured to exit directly to the VMM 18 (e.g. using the VMMCALL instruction), or may be configured to return to the guest 170 with an intercept flagged that will cause an exit to the VMM 18 from the guest. For example, the minivisor 172 may modify the intercept configuration so that the intercept event that caused the exit to the minivisor 172 is configured to use the VMExit mechanism to exit to the VMM 18.

Figure 11:
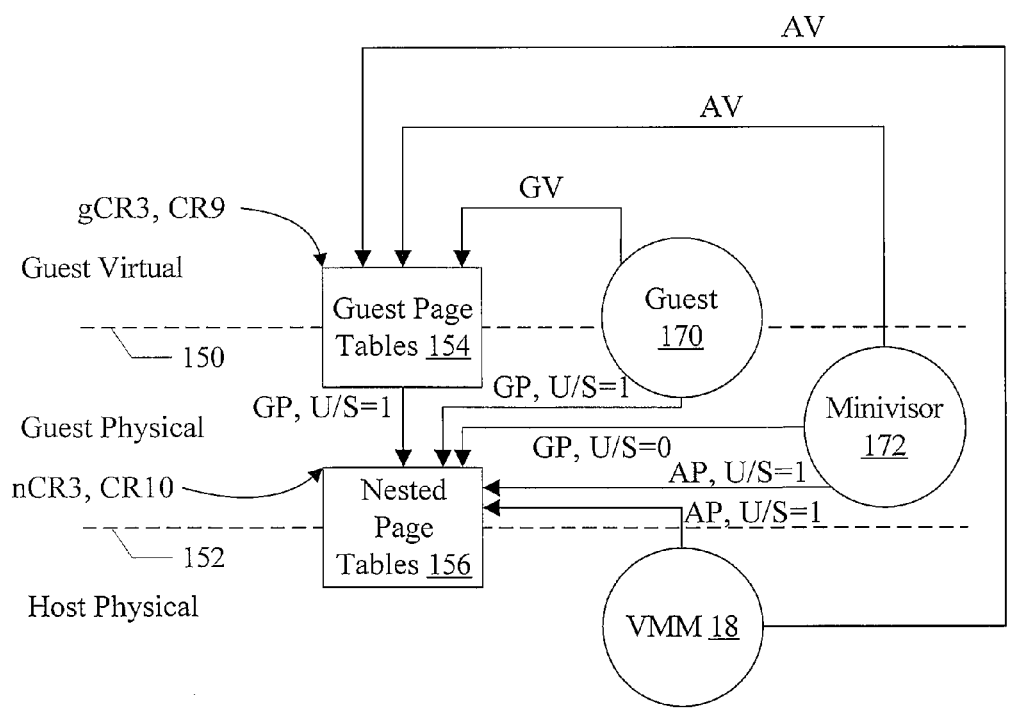
FIG. 11 is a block diagram illustrating one embodiment of address spaces in a virtualized computer system and the guest, minivisor, and host.

FIG. 11 is a block diagram illustrating various address spaces of one embodiment of the computer system, and operation of the various components shown in FIG. 2 within the address spaces for one embodiment. FIG. 11 illustrates a guest virtual address space (above dashed line 150), a guest physical address space (between dashed lines 150 and 152), and a host physical address space (below dashed line 152).

The guest 170 may run partially in the guest virtual address space and partially in the guest physical address space, illustrated by showing the guest 170 straddling the dashed line 150. The guest 170 may manage a set of guest page tables 154, pointed to by a page table base address register (gCR3, in FIG. 11). The guest 170 may translate guest virtual addresses (GV in FIG. 11) to guest physical addresses (GP) through the guest page tables 154.

A set of nested page tables 156 is also shown in FIG. 11, that translates guest physical addresses to host physical addresses. The nested page tables 156 may be pointed to by a second page table base address register (nCR3, in FIG. 11). The two page table base address registers may be implemented in the translation circuitry 48 shown in FIG. 3, for example. The nested page tables 156 may be managed by the VMM 18.

The nested page tables 156 may translate guest physical addresses resulting from the guest page tables 156, as well as guest physical addresses generated directly by the guest 170

(e.g. by the OS). Additionally, the minivisor 172 may execute in the guest physical address space, and may thus generate guest physical addresses. The minivisor 172 may have access to the guest physical address space used by the guest, as well as the guest virtual address space (e.g. by reading the guest page tables 154). In one embodiment, the minivisor 172 may be allocated private guest physical pages in addition to having access to the guest's guest physical pages. That is, the private guest physical pages are accessible to the minivisor 172 but not the guest 170. The private guest physical pages may be supported in various fashions. For example, the private guest physical pages may be provided with supervisor level protection in the nested page tables 156 (U/S=0 in the AMD64 page tables). The guest physical pages used by the guest may be provided with user level protection in the nested page tables 156 (U/S=1 in the AMD64 page tables). The guest 170 may be unable to access the supervisor pages in the nested page tables 156. By marking the minivisor's pages as supervisor (U/S=0) in the nested page tables 156, the minivisor's pages may be protected from the guest. Guest user versus guest OS access may be distinguished by the U/S bit in the guest page tables 154.

Embodiments that implement that alternate address space are illustrated in FIG. 11 as well. When the alternate address space is active, the VMM code (e.g. the VMM 18 and/or the minivisor 172) may issue accesses to the alternate address space, illustrated as alternate virtual (AV) in FIG. 11. The alternate address space may be specified by a set of registers (e.g. the control registers CR9-CR11 in this case, although other embodiments may use other registers). In the present embodiment, CR9 is the analog to CR3 for the alternate address space, and thus stores the page table base address of the page tables to be used to translate alternate virtual addresses. Similarly, CR10 is the analog to nCR3 for the alternate address space, and thus stores the page table base address for the nested page tables. Providing CR10 for the nested page tables in the alternate address space may provide flexibility for software usage, because the nested page tables in the alternate address space may be different from the nested page tables in the current address space. In other embodiments, the nested page tables may not be implemented, and thus CR10 may not be needed. In still other embodiments, the alternate address space may used the same nested page tables as the minivisor 172, and thus CR10 may not be needed in such cases as well. CR11 may store the ASID of the alternate address space, and various paging enable control bits, page size controls, etc. that correspond to bits implemented in CR0, CR4, etc. in the x86 instruction set. Generally, control bits that affect the paging operation of the processor may be stored in CR11 with the ASID.

Accordingly, as illustrated in FIG. 11, an alternate address space virtual address issued by the minivisor 172 or the VMM 18 may be translated via the page tables indicated by the page table base address in CR9 (e.g. the guest page tables 154, in FIG. 11). The corresponding guest physical addresses may be translated through the nested pages tables indicated by the page table base address in CR10 (e.g. the nested page tables 156 in FIG. 11). In some embodiments, the minivisor 172 and/or the VMM 18 may issue alternate address space physical addresses (AP in FIG. 11) to be translated through the nested page tables indicated by the page table base address in CR10. The alternate address space physical addresses may thus be translated in the same way that guest physical addresses issued by the guest 170 are translated when the guest is executing. It is noted that, while FIG. 11 illustrates passing various addresses through the page tables shown in FIG. 11, the translations may be accomplished in the processor's TLB(s).

Issuing accesses to the alternate address space may thus permit the minivisor 172 and/or the VMM 18 to access memory that is allocated to the guest, without having to walk the guest page tables 154 and the nested page tables 156 in software. The minivisor 172 and/or the VMM 18 may be less complex to design, and may have higher performance than implementations that walk the page tables in software. Additionally, translations for the alternate address space may hit in the processor's TLB(s), which may speed the translation process even further.

Figure 12:
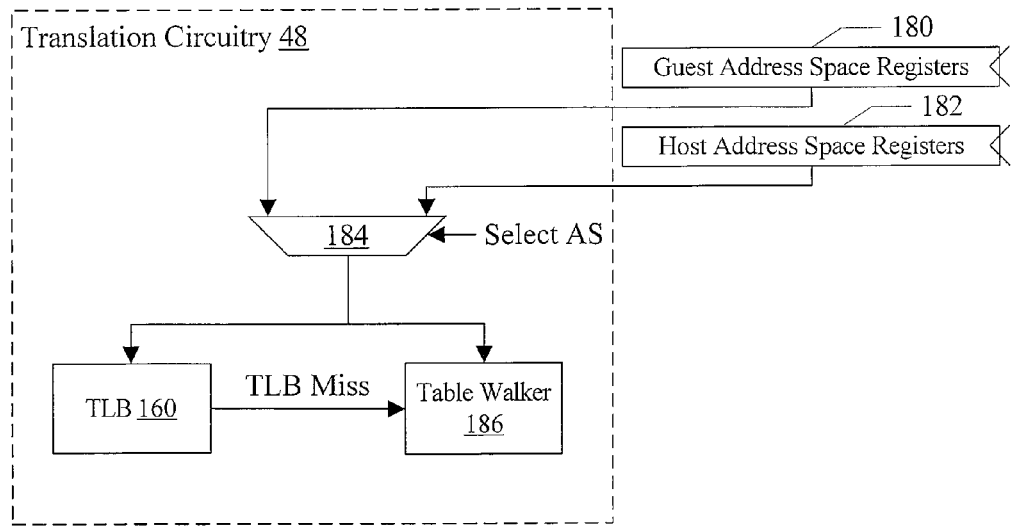
FIG. 12 is a block diagram of one embodiment of a portion of the translation circuitry 48.

As mentioned above, in one embodiment, the processor may move the guest address space configuration data from the gCR3, nCR3, CR0, and CR4 to the alternate address space registers CR9-CR11 as part of a guest exit. Another embodiment that does not involve copying data from one register to another is illustrated in FIG. 12. FIG. 12 illustrates translation circuit 48 coupled to guest address space registers 180 and host address space registers 182. Specifically, in the illustrated embodiment, the registers 180 and 182 may be coupled as inputs to the address space selection multiplexor (mux) 184, which may receive a selection control (select AS). The select AS control may be generated by the translation circuitry 48. For example, truth tables in FIGS. 14-16, described below, illustrate embodiments of the generation of the select AS control.

The processor may load the guest address space registers 180 from the VMCB 22 of a guest in response to the VMRUN instruction. Particularly, the guest address space registers may be loaded with the gCR3, nCR3, and other control bits in CR0 and CR4 based on the VMCB 22 contents. The processor may load the host address space registers in response to a guest exit (e.g. from the host processor state 50). Alternatively, the host address space registers 182 may be directly programmed by the host software (e.g. the VMM 18 and/or the minivisor 172) with the host address space data.

The address space selection mux 184 may select the guest address space or the host address space, dependent on whether the guest is executing or the VMM code is executing and dependent on the address space selected for an instruction. If the guest is executing, the guest address space registers 180 may be selected. If the VMM code is executing, the host address space registers 182 may be selected if the access is in the host address space, and the guest address registers 180 may be selected if the access is in the alternate address space. Implementing the selection of address space based on the mode of execution (guest or not guest) and the requested address space in the case of "not guest mode" may permit an alternate address space implementation in which address space state need not be copied from one register to another at a world switch.

The values for the selected address space are provided to the translation lookaside buffer (TLB) 160 and to the table walker 186 in the translation circuitry 48. For example, the ASID of the selected address space may be provided to the TLB 160, along with the virtual address (GV or AV, depending on the source, in FIG. 11). The TLB 160 may detect a hit or miss based on the ASID/virtual address combination. The TLB 160 may signal TLB misses to the table walker 186, which may walk the translation tables based on the page table base address and nested page table base address from the selected address space. The TLB 160 may be implemented in any desired fashion (e.g. separate instruction and data TLBs, a combined instruction/data TLB, separate instruction and data TLBs at a first level with a combined second level TLB, etc.).

Figure 13:
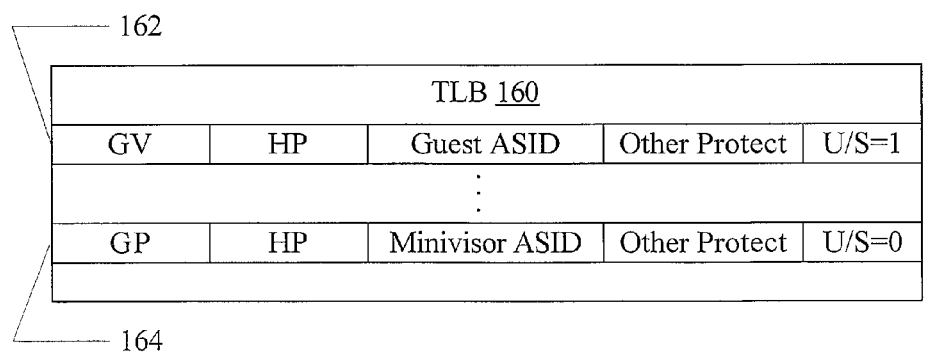
FIG. 13 is a block diagram of one embodiment of a translation lookaside buffer that may be implemented in the processor.

Turning now to FIG. 13, a block diagram of one embodiment of the TLB 160 is shown that may be implemented by the translation circuitry 48. The TLB 160 may include various entries, including an entry 162 and an entry 164. The entry 162 in FIG. 13 is illustrated storing a guest translation, which translates from the guest virtual address (GV) to a host physical address (HP). In this embodiment, then TLB 160 may tag entries with an address space identifier (ASID) corresponding to the process that generated the translation request corresponding to the entry. That is, the guest ASID may be stored in the guest address space registers 180 if the corresponding guest is the most recent guest executing on the processor. Thus, the entry 162 stores a guest ASID assigned to the guest 170. Various other protection data (Other Protect, in FIG. 13) may be stored, and the U/S bit for the translation may be 1. The entry 164 stores a minivisor translation, and thus translates from a guest physical (GP) to a host physical (HP) address. The ASID may be a minivisor ASID, and the other protection and U/S fields (U/S=0, in this case) are provided. The minivisor ASID may be provided in any fashion. In the present embodiment, the minivisor ASID (and other paging control bits) may be the same as the VMM 18's ASID and may be stored in the host address space registers 182. In other embodiments, the minivisor ASID may be the same as the guest ASID for the corresponding guest, and an additional bit may be set in the entry to indicate that the entry is a minivisor entry. Alternatively, the minivisor ASID may be equal to the guest ASID+0x800 (i.e. inverting the most significant bit of the ASID). A hit is detected in an entry if the input virtual address matches the address to be translated, the entry is valid, and the ASID in the entry matches the selected ASID.

FIGS. 14-16 illustrate truth tables for the select AS signal, according to various embodiments of the translation circuitry 48 shown in FIG. 12. In the embodiment of FIG. 12, the translation circuitry 48 selects between the guest address space (defined in the guest address space registers 180) and the host address space (defined in the host address space registers 182). Also illustrated in parentheses for the selected address space is whether the selected address space is the current address space or the alternate address space, for embodiments which copy the guest address space definition from the current address space registers to the alternate address space registers (i.e. CR9-CR11, in one embodiment). The truth tables includes a "mode" column, which indicates whether guest code or non-guest code (e.g. VMM code, including VMM 18 and/or the minivisor 172) is executing. There may or may not be a specific "mode" bit that indicates whether a guest is in execution. For example, logic in the processor 30 may derive the guest/non-guest "mode" from various state in the processor. The discussion below will refer to guest/non-guest mode for simplicity, but any manner for determining the guest/non-guest mode may be implemented. Generally, the processor may be in guest mode from the successful execution of the VMRUN instruction until an exit is performed, and may be in non-guest mode otherwise. Additionally, each embodiment illustrated in FIGS. 14-16 indicates that only the current (guest) address space is accessible in guest mode and that the default address space for instruction (code) fetches in non-guest mode is the host address space.

Turning next to FIG. 14, a first truth table is shown illustrating a first embodiment of the selection of address space (guest or host) for the embodiment illustrating in FIG. 12. In the embodiment of FIG. 14, the alternate address space may be the default address space for data accesses in the non-guest mode. The CS segment override prefix byte may be used on an instruction having a data access, to specify that the current address space is to be accessed instead of the alternate address space. Accordingly, the truth table of FIG. 14 indicates that data accesses in non-guest mode for instructions that do not include the CS segment override prefix byte use the guest (alternate) address space. Data accesses in non-guest mode for instructions that include the CS segment override prefix byte use the host (current) address space.

By defaulting data accesses to the alternate address space in non-guest mode, the operation of emulation code in the host (e.g. code that is a binary translation of the code for which an intercept is detected) may be simplified. Furthermore, the contents of the segment registers may be preserved in the guest state, and the operation of other segment override prefix bytes may be maintained. Other embodiments may use other segment override prefix bytes to specify the host (current) address space. Still further, other embodiments may use other instruction encodings and/or operands of instructions to select the desired address space in non-guest code.

FIG. 15 is an embodiment that does not maintain the guest state in the segment registers. Accordingly, the guest segment register state may be saved, and new segment register state may be created, by the software that executes after an exit from the guest. Alternatively, some embodiments may save the guest segment register state and/or load the desired segment register state in hardware.

For the embodiment of FIG. 15, a new segment type may be defined in the instruction set architecture to specify that the alternate address space is selected. For example, in one embodiment, a non-system segment with type field 0xA may be used. In another embodiment, a system segment type may be defined, although the alternate address space is not a system segment. The code/data bit in the non-system segment may be set to code (and loaded into a data segment register) to identify various segment types in the alternate address space. Still other embodiments may use a bit in the segment descriptor to indicate alternate address space.

For the embodiment of FIG. 15, non-guest mode data accesses for which the segment type indicates the alternate address space use the guest (alternate) address space and non-guest mode data accesses for which the segment type does not indicate the alternate address space use the host (current) address space. Embodiments similar to the embodiment of FIG. 15 may provide flexibility in which segments are alternate address space and which segments are current address space. For example, the embodiment of FIG. 15 may permit the stack segment to be alternate address space while other segments are current address space, or vice versa.

The embodiment of FIG. 16 specifies one or more separate "accessor function" instructions which may be used to access the alternate address space. The accessor function instructions may comprise at least one load instruction to read bytes from the alternate address space and at least one store instruction to write bytes to the alternate address space. If multiple load or store instructions are defined, different sizes of loads and stores may be implemented (e.g. byte, word, double word, etc.), for example.

For the embodiment of FIG. 16, the data accesses for non-accessor-function instructions in non-guest mode may use the host (current) address space and accessor instruction accesses may use the guest (alternate) address space.

Separate CR3 for Minivisor

Figure 17:
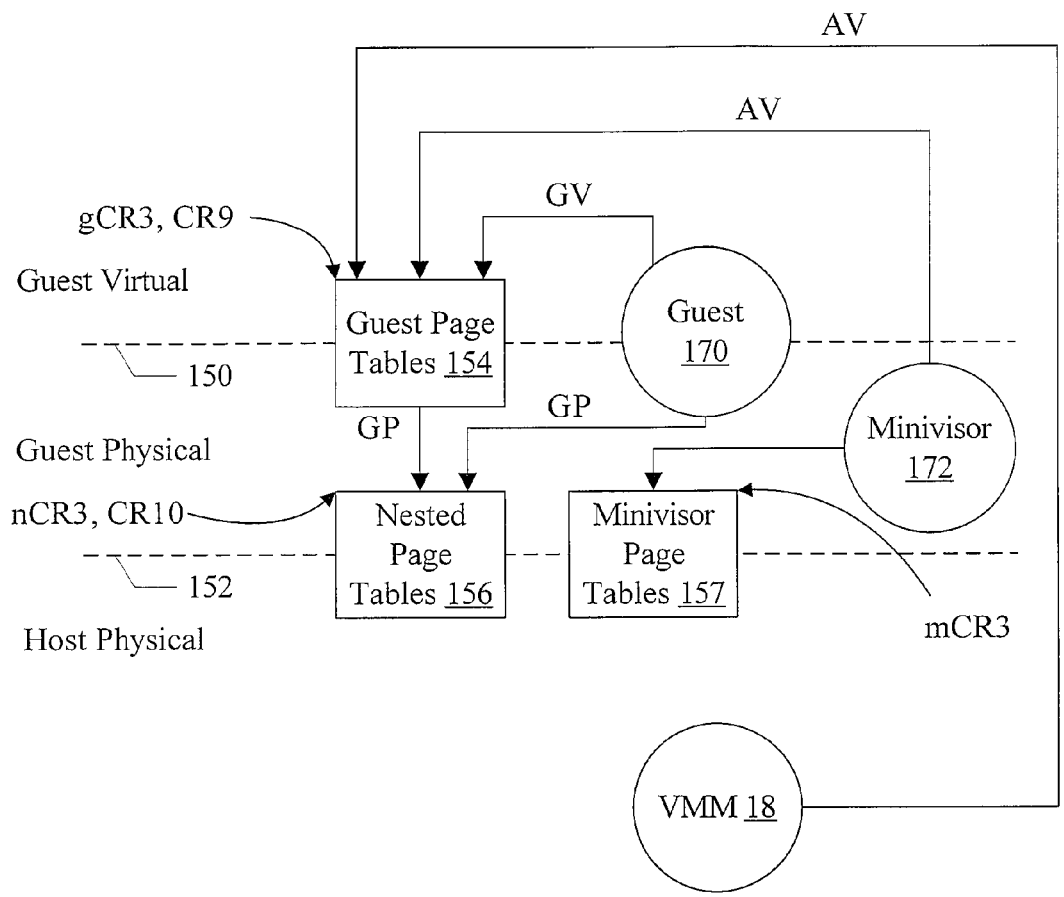
FIG. 17 is a block diagram illustrating another embodiment of address spaces in a virtualized computer system and the guest, minivisor, and host.

Turning now to FIG. 17, a block diagram similar to that of FIG. 11 is shown to illustrate one embodiment of implementing a separate page table base address register for the minivisor 172. The minivisor's page table base address register (labeled mCR3 in FIG. 17) may be provided in addition to the gCR3 and the nCR3. The remaining address space state for the minivisor may be the same as the VMM 18. Other embodiments may implement a "minivisor address space" similar to the alternate address space defined above. In such embodiments, there may be an additional register with mCR3 to store a minivisor ASID and other paging mode control bits.

In the embodiment of FIG. 17, addresses issued by the minivisor 172 may be translated to the host physical address space through a set of minivisor page tables 157. The minivisor pages tables 157 may be separate from the nested page tables 156 and the guest page tables 154. Accordingly, the translations for the minivisor may be in a separate data structure from the guest translations and thus an additional degree of separation may be provided between the minivisor and the guest. Additionally, the VMM 18 may implement a lower level of "trust" with the minivisor than the trust for code in the VMM 18 itself, by keeping the minivisor translations separate. Minivisors produced by another entity than the entity that produces the VMM 18 may be used, for example. Minivisors produced by the entity that produces the guest may be used.

In some cases, it may be desirable for the minivisor to have direct access to a host physical page that is mapped to the guest. In such cases, the VMM 18 may allocate a translation in the minivisor page tables 157 that translates to the desired host physical page. The nested page tables 156 may map the guest physical address to the desired host physical page as well, effectively sharing the host physical page. Other embodiments may implement the alternate address space (AV in FIG. 17), which may permit the minivisor to access desired guest state through the guest pages tables 154 and the nested page tables 156.

While having the mCR3 for the minivisor may provide flexibility in mapping the minivisor and guest into host physical memory, the mCR3 may be programmed to point to the nested page tables 156 if operation similar to that shown in FIG. 11 is desired. The mCR3 may be one of the control registers 42 in FIG. 3, or may be one of the VM registers 46. In one embodiment, the mCR3 may be included as a field in the VMCB 22 as well.

Figure 18:
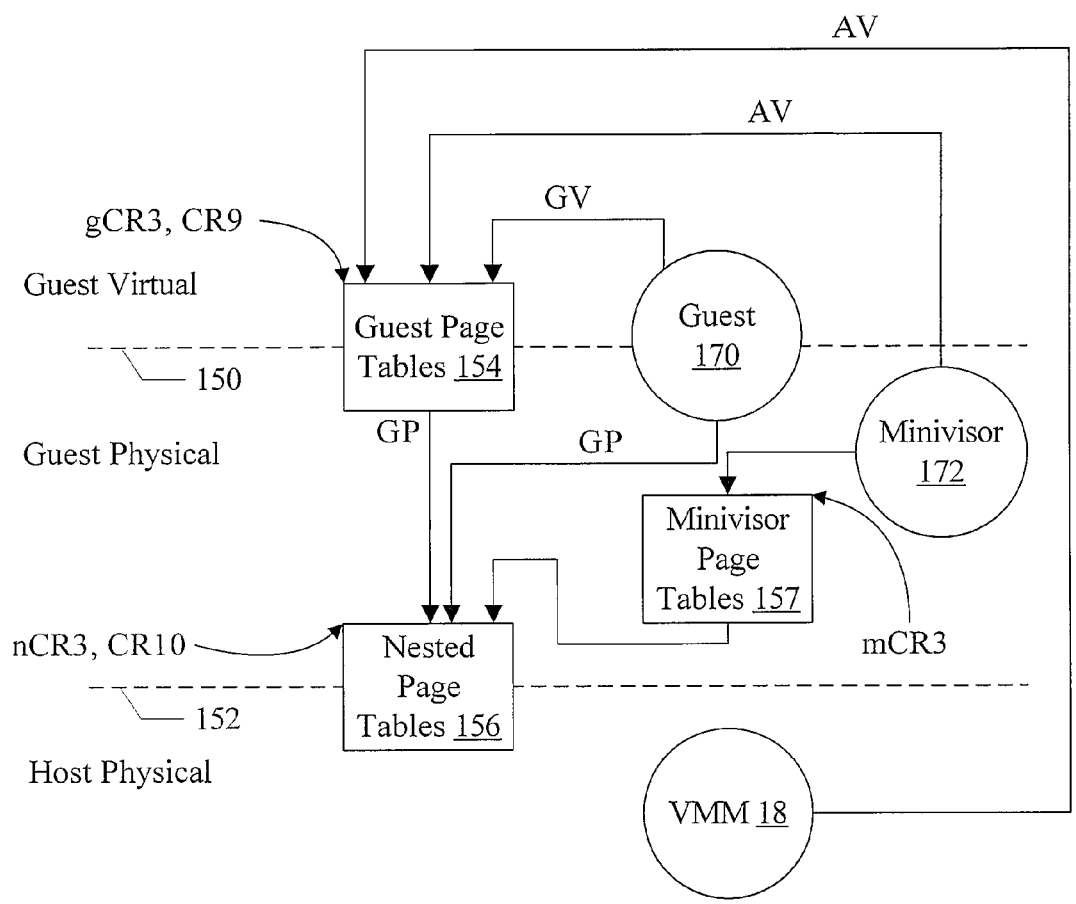
FIG. 18 is a block diagram illustrating still another embodiment of address spaces in a virtualized computer system and the guest, minivisor, and host.

In some embodiments, it may be desirable to further translate translations from the minivisor page tables 157 through the nested page tables 156, similar to the guest page tables 154. Since the VMM 18 may control the minivisor page tables 157, it is expected that the minivisor page tables need not be translated through the nested page tables 156. However, such an option may be supported (e.g. as shown in FIG. 18, in which the output of the minivisor page tables 157 is input to the nested page tables 156). Still other embodiments may be programmable as to whether the minivisor page table translations are translated through the nested page tables 156, either as a whole (e.g. a configuration bit) or on a minivisor page by minivisor page basis (e.g. a bit in the page table entries in the minivisor page tables 157).

Figure 19:
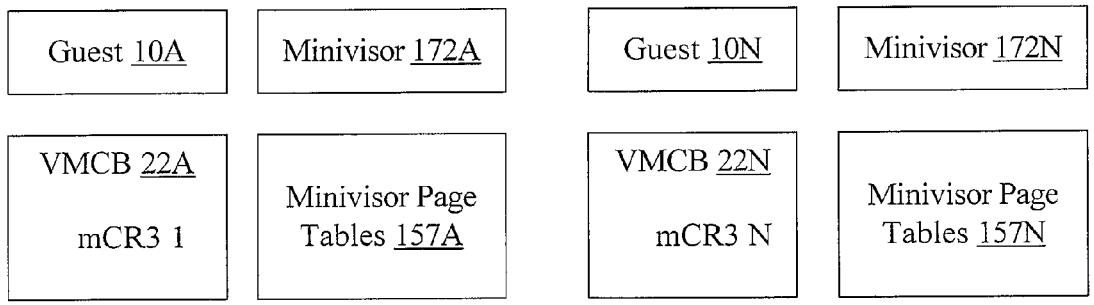
FIG. 19 is a block diagram illustrating one embodiment of various guests and corresponding minivisors and related state.

Since the mCR3 is part of the VMCB 22, in this embodiment, there may be a separate minivisor 172 (and corresponding minivisor page tables 157) for each guest. For example, FIG. 19 illustrates two guests 10A and 10N, with their corresponding VMCBs 22A and 22N. The VMCBs 22A and 22N each include a mCR3 value (mCR3 1 in VMCB 22A and mCR3 N in VMCB 22N). Accordingly, separate minivisor page tables 157A and 157N are associated with the guests, and separate minivisors 172A and 172N are associated with the guests.

Providing the separate minivisor page tables on a per-guest basis, and the separate minivisor on a per-guest basis, may again increase the flexibility for the VMM 18. For example, different minivisors may be used for different types of guests, and thus the minivisor functionality may be tailored to the guest. A minivisor having a smaller memory footprint may be possible. Of course, the same minivisor may be used for two or more guests. If desired, the minivisor page tables may differ between guests that are using the same minivisor code, or the minivisor page tables may be shared by coding the mCR3 in each sharing guest's VMCB to the same address.

Figure 20:
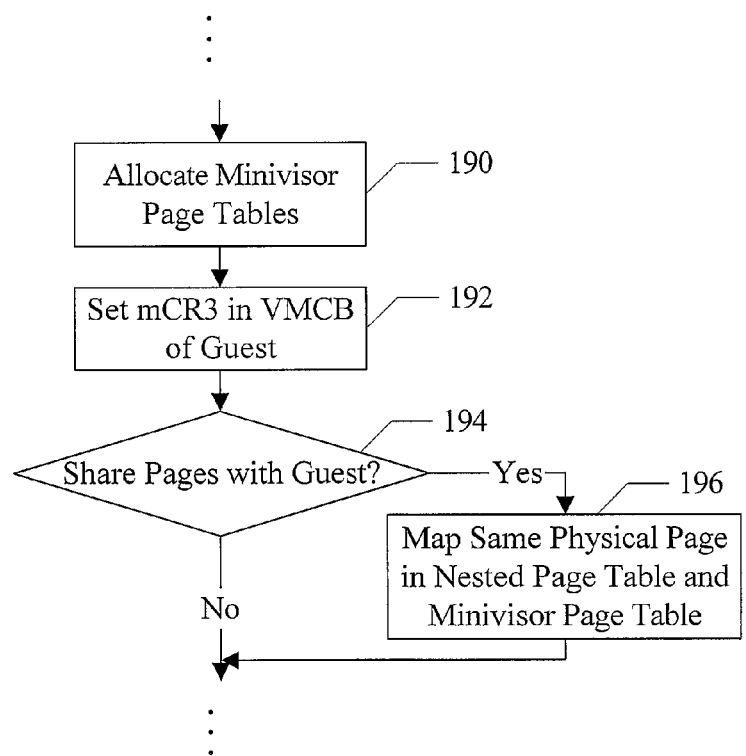
FIG. 20 is a flowchart illustrating operation of one embodiment of a VMM managing minivisors for guests.

FIG. 20 is a flowchart illustrating a portion of one embodiment of the VMM 18 initializing a guest for execution. The portion illustrated in FIG. 20 may have to do with initializing the minivisor 172 and related data. While the blocks are shown in a particular order for ease of understanding in FIG. 20, other orders may be used. The VMM 18 may comprise instructions which, when executed, implement the operation illustrated in FIG. 20.

The VMM 18 may allocate the minivisor page tables 157 (block 190). The VMM 18 may set the mCR3 field in the guest's VMCB 22 to point to the minivisor page tables (block 194). If it is desirable for the minivisor 172 to share one or more host physical pages with the guest (decision block 194, "yes" leg), the VMM 18 may map the same physical page in the nested page table (from the guest physical address) and the minivisor page table (from the minivisor address) (block 196). It is noted that decision block 194 and block 196 may also be performed whenever new host physical pages are allocated to the guest and mapped in the nested page tables as well.

Minivisor Entry Point into VMM Address Space

Figure 21:
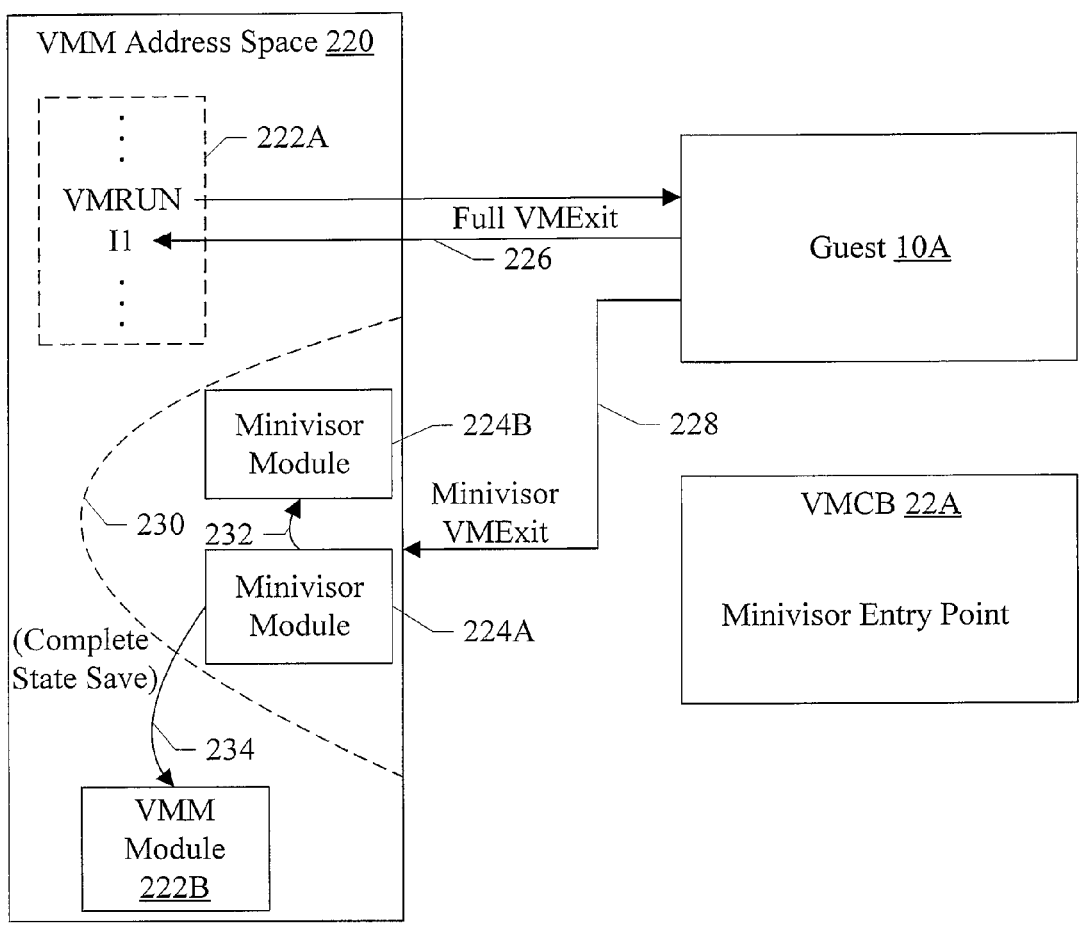
FIG. 21 is block diagram illustrating one embodiment of a minivisor implemented as an entry point in the VMM's address space.

In some embodiments, the minivisor 172 may be implemented as a defined entry point into the VMM address space. FIG. 21, for example, illustrates an embodiment in which the minivisor is implemented as an entry point. In FIG. 21, the guest 10A is shown, as well as its corresponding VMCB 22A. A VMM address space 220 is also shown. Within the address space 220 are one or more VMM modules such as modules 222A-222B and one or more minivisor modules such as minivisor modules 224A-224B. The VMM module 222A is illustrated in greater detail to include a VMRUN instruction to launch execution of the guest 10A and an instruction following the VMRUN instruction (I1).

FIG. 21 illustrates the heavy-weight exit mechanism as a full VMExit (e.g. arrow 226). The full VMExit stores guest state and loads VMM state, as described previously for the heavy-weight mechanism. The light-weight exit mechanism is illustrated as the minivisor VMExit (e.g. arrow 228), and saves/restores a smaller amount of state. The minivisor VMExit may cause instruction execution to beginning at the minivisor entry point address, which may locate one of the minivisor modules 224A-224B in the VMM address space 220 (e.g. the minivisor module 224A in FIG. 21). Accordingly, the VMM modules 222A-222B may "expect" that the heavy-weight state save has been performed. That is, the modules 222A-222B may be coded to overwrite state that is saved/restored in the heavy-weight mechanism without saving the current values for that state. On the other hand, minivisor modules 224A-224B may be coded to save state that is not saved by the light-weight exit mechanism (but that would be saved in the heavy-weight mechanism) prior to overwriting such state. Each module 222A-222B and 224A-224B may be coded based on whether it is expected to be used at a minivisor VMExit or a full VMExit. The boundary between minivisor modules 224A-224B and VMM modules 222A-222B is illustrated by a dotted line 230 in FIG. 21. The dotted line is a logical boundary, and is not intended to indicate that all of the minivisor modules 224A-224B are located in contiguous memory bound by the dotted line 230.

Generally, minivisor modules may call other minivisor modules (e.g. arrow 232) without any additional state save. However, if a minivisor module calls a VMM module (e.g. arrow 234), the calling minivisor module may complete the state save so that the same state that is saved by the full VMExit is saved before calling the VMM module. That is, any state saved by the full VMExit that is not saved by the minivisor VMExit may be saved by the calling minivisor module.

In the illustrated embodiment, the full VMExit begins execution at the instruction following the most recent VMRUN instruction (e.g. instruction I1 in the module 222A). There may be multiple VMRUN instructions in the various VMM modules. On the other hand, the minivisor VMExit may be directed to a specified entry point in the VMM address space 220. The entry point may be defined in any desired fashion. For example, the minivisor entry point address may be part of the corresponding VMCB 22A in FIG. 21. Such an embodiment may permit flexibility in entry points between different guests, if desired. The entry point may be defined in a VM register 46 or another register in the processor that is not modified by VMRUN/full VMExit operations, and thus may be the same for each guest. The entry point may even be defined as a fixed entry point, or a fixed offset from the beginning of the VMM address space 220, if desired.

Figure 22:
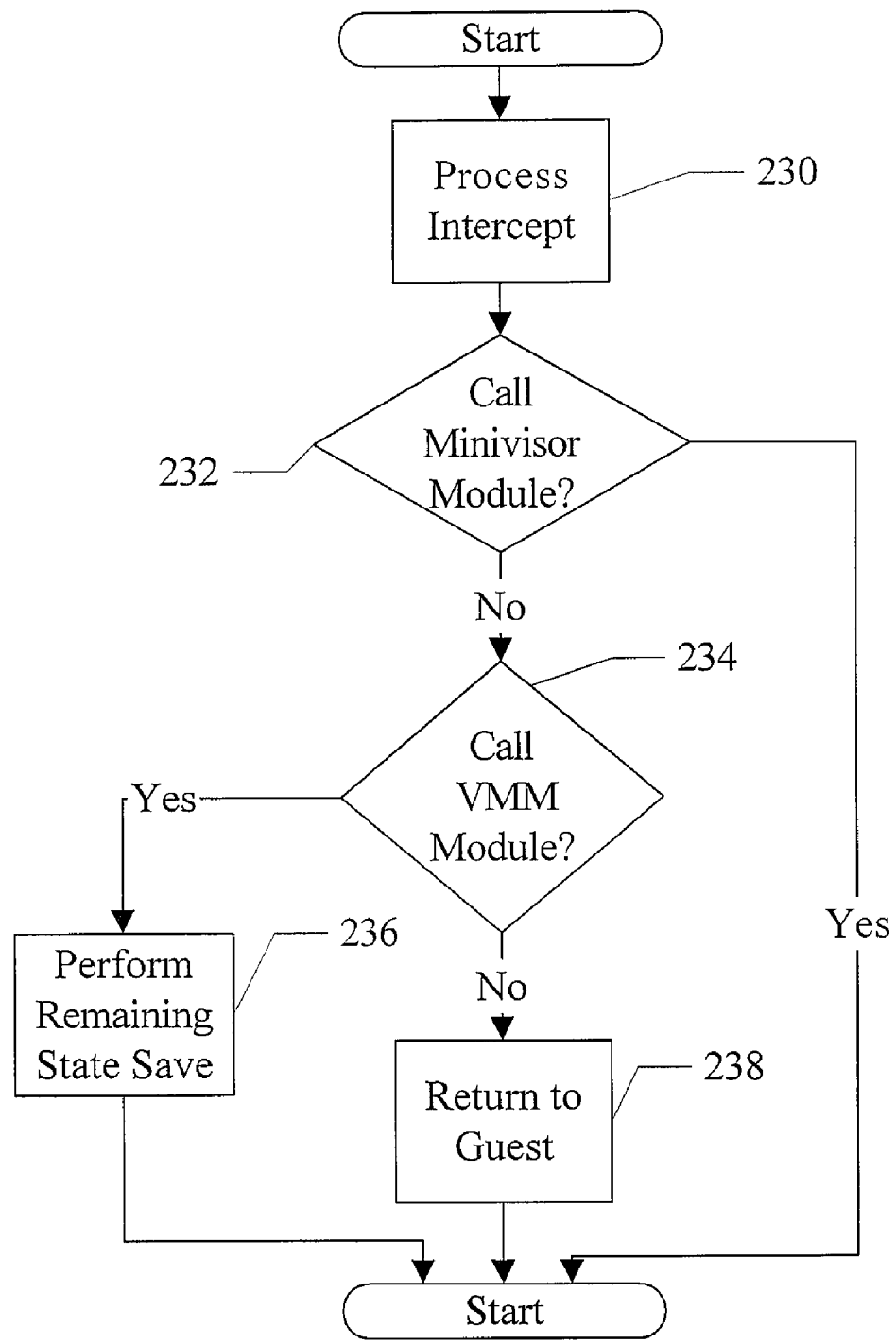
FIG. 22 is a flowchart illustrating operation of one embodiment of a minivisor module shown in FIG. 21.

FIG. 22 is a flowchart illustrating operation of one embodiment of a minivisor module 224A-224B, for one embodiment. The minivisor module may comprise instructions which, when executed, implement the operation illustrated in FIG. 22.

The minivisor module 224A-224B may process the intercept (or a portion of the intercept) for which the minivisor module 224A-224B is defined (block 230). When the minivisor module 224A-224B has completed its processing, it may determine that the module is to call another minivisor module 224A-224B (to continue minivisor processing of the intercept); to call a VMM module 222A-222B (because the minivisor cannot complete the processing of the intercept); or to return to the guest 10A-10N that exited (because the intercept has been fully processed).

If the call is to another minivisor module (decision block 232, "yes" leg), the minivisor module may simply call the other module.

If the call is to a VMM module 222A-222B (decision block 234, "yes" leg), the minivisor module may complete the state save, saving state that was not saved by the minivisor VMExit and that would have been saved by the full VMExit mechanism (block 236). The minivisor module may complete the state save in a variety of fashions. For example, in one embodiment, an instruction similar to the VMSAVE instruction discussed previously may be defined to store the remaining state. A VMSAVE instruction with a prefix (e.g. a segment override prefix) may be used as the new instruction, for example. Alternatively, a set of instructions may be coded to perform the state save. If a set of instructions is used, the set of instructions may itself be a minivisor module 224A-244B.

If the minivisor module is to return back to the guest (decision blocks 232 and 234, "no" legs), the minivisor module may invoke the guest to continue execution (block 238).

FIG. 23 is a table 130 illustrating additional processor state saved via execution of the VMSAVE instruction and loaded via execution of the VMLOAD instruction for one embodiment. Other embodiments may save/load any state, including any subset or superset of the state shown. In the illustrated embodiment, state saved/loaded includes the selector and hidden portions of the FS and GS segment registers; the local descriptor table register (LDTR) including hidden portion that stores the descriptor for the local descriptor table from the global descriptor table; the task register (TR) including hidden state; the KernelGSBase register defined in the AMD64™ extension; the STAR, LSTAR, CSTAR, and SFMASK registers used with the SYSCALL and SYSRET instructions; and the CS, ESP, and EIP values used with the SYSENTER instruction.

Turning now to FIG. 24, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) etc.

The computer accessible storage medium 200 in FIG. 24 may store one or more of the VMM 18, one or more VMCBs 22, the host save area 50, the minivisor 172, and/or guests 10A-10N. The VMM 18 may comprise instructions which implement the operations described for the VMM 18 herein. Similarly, the minivisor 172 may comprise instructions which implement the operation of the minivisor as described herein. Generally, the computer accessible medium 200 may store any set of instructions which, when executed, implement a portion or all of the operations shown in FIGS. 10, 20, and 22. The computer accessible storage medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
    detecting a guest exit during execution of a guest on a processor configured to execute the guest, wherein a guest exit comprises interrupting execution of the guest in response to one or more intercepts programmed in the processor by a virtual machine monitor (VMM) that controls a virtual machine that encapsulates the guest;
    determining, by the processor, that the guest exit is to a minivisor, wherein a first amount of guest state saved by the processor to memory during the guest exit to the minivisor is less than a second amount of guest state saved by the processor to memory during a guest exit to the VMM, wherein the guest state is processor state generated during the execution of the guest; and
    response to determining that the guest exit is to the minivisor, the processor exiting to a defined entry point in a VMM address space, the defined entry point associated with the minivisor, wherein the defined entry point is different from an address of a first instruction that follows a second instruction in program order of the VMM, wherein the second instruction is executed to invoke the guest.

2. The method as recited in claim 1 wherein the entry point is an offset from a base of the VMM address space.

3. The method as recited in claim 1 wherein the entry point is an address that lies in the VMM address space.

4. The method as recited in claim 1 further comprising:
    returning to the guest;

detecting a second guest exit to the VMM; and exiting to the first instruction that follows the second instruction in the program order of the VMM.

5. The method as recited in claim 1 wherein the minivisor comprises a plurality of minivisor modules, and wherein a first module of the plurality of minivisor modules is located at the entry point address.

6. The method as recited in claim 5 wherein the first module includes a call to a second module of the plurality of modules, the method comprising performing the call without saving additional guest state save.

7. The method as recited in claim 6 wherein the first module includes a call to a VMM module, wherein the method further comprises performing additional an state save prior to performing the call to the VMM module.

8. The method as recited in claim 7 wherein the additional state save comprises the state that is in the second amount but not the first amount.

9. The method as recited in claim 1 further comprising performing an additional state save prior to performing a call to the VMM.

10. The method as recited in claim 1 further comprising storing the defined entry point address in a virtual machine control block corresponding to the guest prior to invoking the guest.

11. The method as recited in claim 10 further comprising loading the defined entry point address into the processor responsive to invoking the guest.

12. The method as recited in claim 1 further comprising programming the entry point address into a processor.

13. A computer accessible storage medium storing a plurality of instruction which, when executed by a processor:

determine that a call to a virtual machine monitor (VMM) is to be performed, wherein the plurality of instructions are executed in response to a guest exit from a guest executed by the processor during use, wherein the guest exit is to a defined entry point associated with a minivisor, wherein the defined entry point is different from an address of a first instruction that follows a second instruction in program order of the VMM, wherein the second instruction is executed to invoke the guest, wherein the guest is a second plurality of instructions executed within a virtual machine controlled by the VMM, and wherein the guest exit includes interrupting execution of the guest in response to one or more intercepts programmed in the processor by the VMM, and wherein a first amount of guest state saved by the processor to memory during the guest exit to the minivisor is less than a second amount of guest state saved by the processor to memory during a guest exit to the VMM, wherein the guest state is processor state generated during execution of the guest by the processor; and save additional guest state prior to calling the VMM, wherein the additional guest state comprises state that is included in the second amount of guest state and not in the first amount of guest state.

14. The computer accessible storage medium as recited in claim 13 wherein the plurality of instructions, when executed:

determine that a call to another minivisor module is to be performed; and perform the call to the other minivisor module without saving additional guest state prior to the call.

15. The computer accessible storage medium as recited in claim 13 wherein the plurality of instructions, when executed, store the defined entry point address in a virtual machine control block corresponding to the guest prior to invoking the guest.

16. The computer accessible storage medium as recited in claim 13 wherein the plurality of instructions, when executed, program the entry point address into a processor.

17. A processor comprising an execution core configured to execute a guest comprising a plurality of instruction that execute within a virtual machine controlled by a virtual machine monitor (VMM), wherein the execution core is configured to detect a guest exit during execution of the guest, and wherein a guest exit includes interrupting execution of the guest in response to one or more intercepts programmed in the processor by the VMM, and wherein the execution core is configured to determine that the guest exit is to a minivisor, wherein a first amount of guest state saved by the processor to memory during the guest exit to the minivisor is less than a second amount of guest state saved by the processor to memory during a guest exit to the VMM, and wherein guest state is processor state generated during execution of the guest by the processor, and wherein, responsive to determining that the guest exit is to the minivisor, the processor core is configured to exit to a defined entry point in a VMM address space, the defined entry point associated with the minivisor, wherein the defined entry point is different from the address of a first instruction that follows a second instruction in program order of the VMM, wherein the second instruction is executed to invoke the guest.

18. The processor as recited in claim 17 wherein the execution core is further configured to detect a guest exit to the VMM and to exit to the first instruction that follows the second instruction in the program order of the VMM.

* * * * *